Oct. 4, 1966 J. R. FOTHERINGHAM ETAL 3,276,301
CUT OFF MACHINE FOR CUTTING ELONGATED STOCK INTO BLANKS
Filed Nov. 9, 1964 15 Sheets-Sheet 7
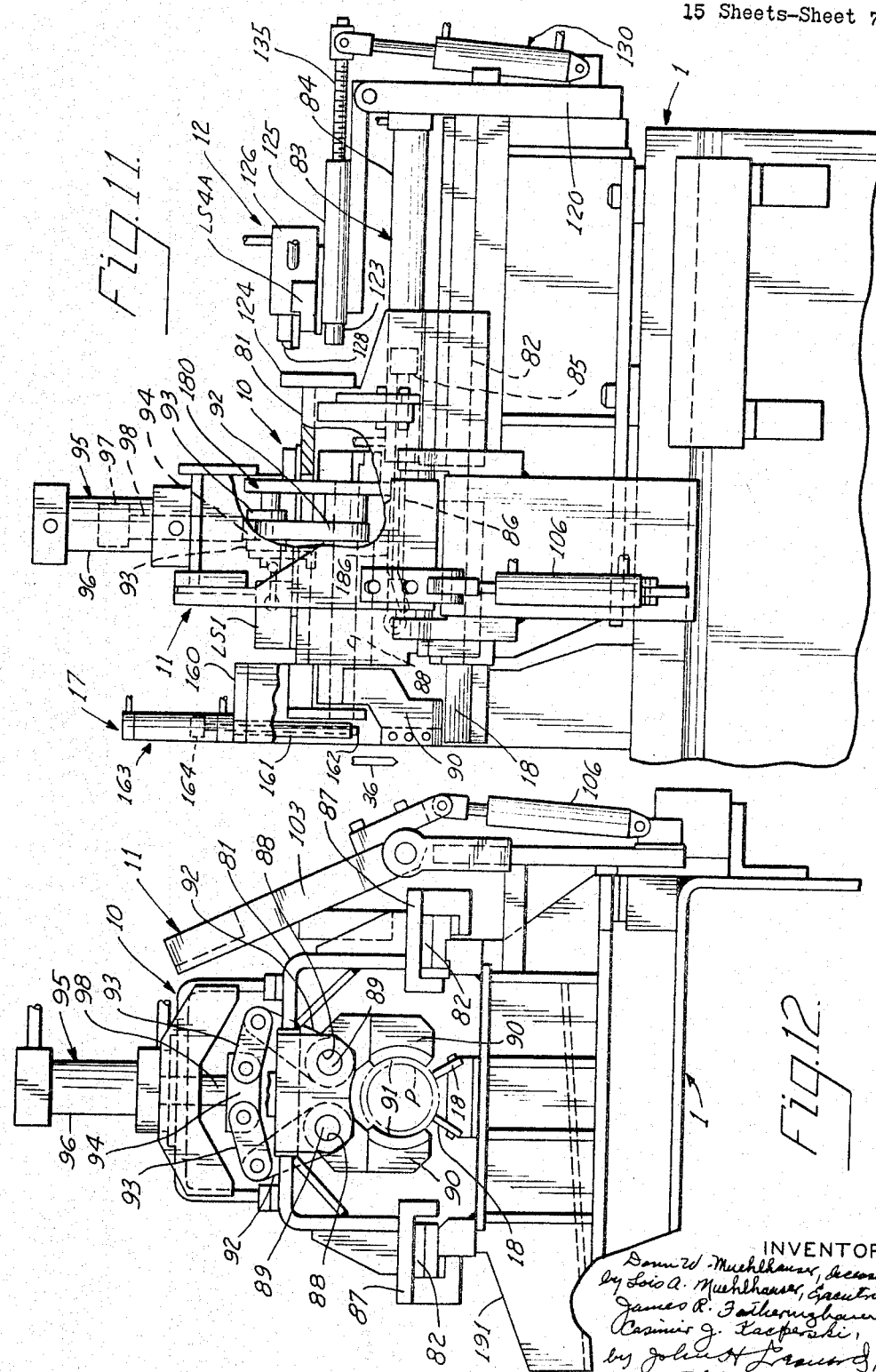

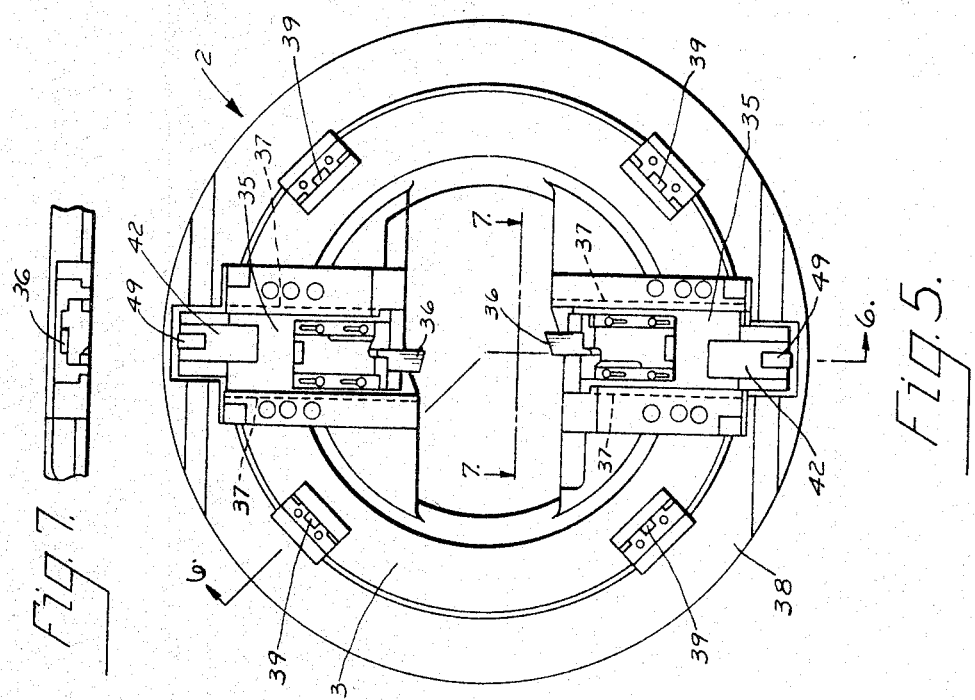
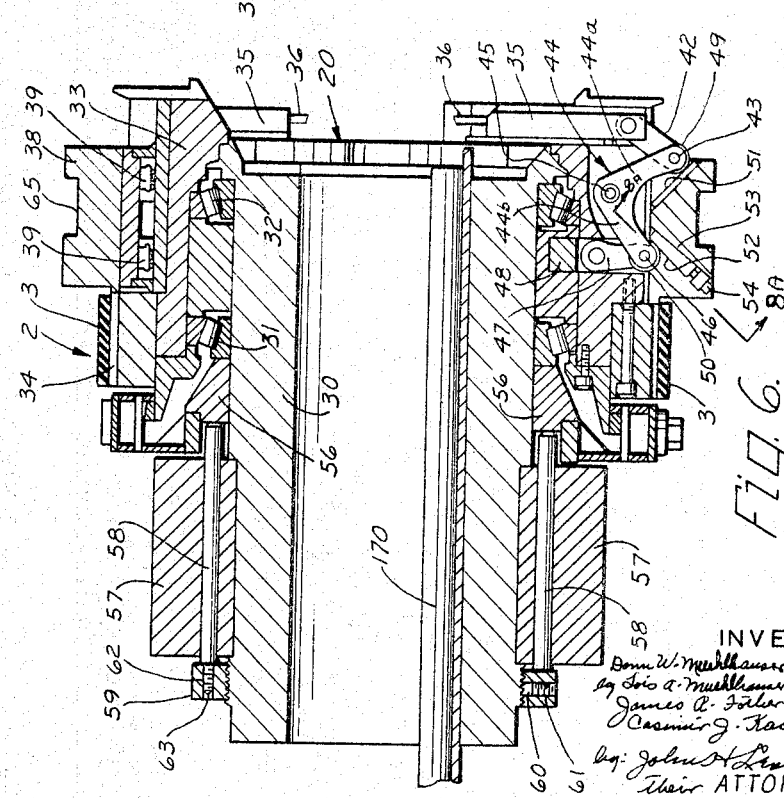

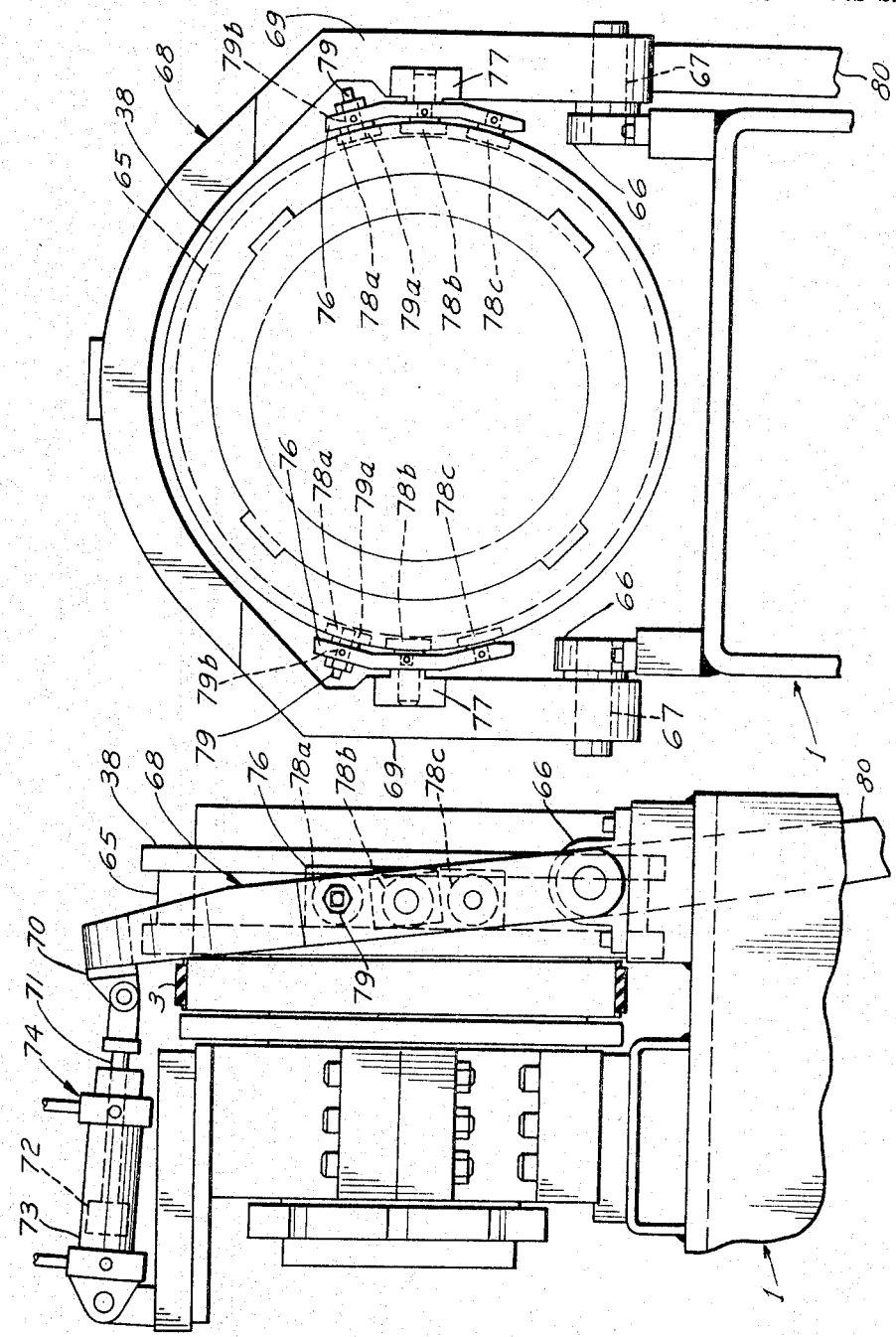

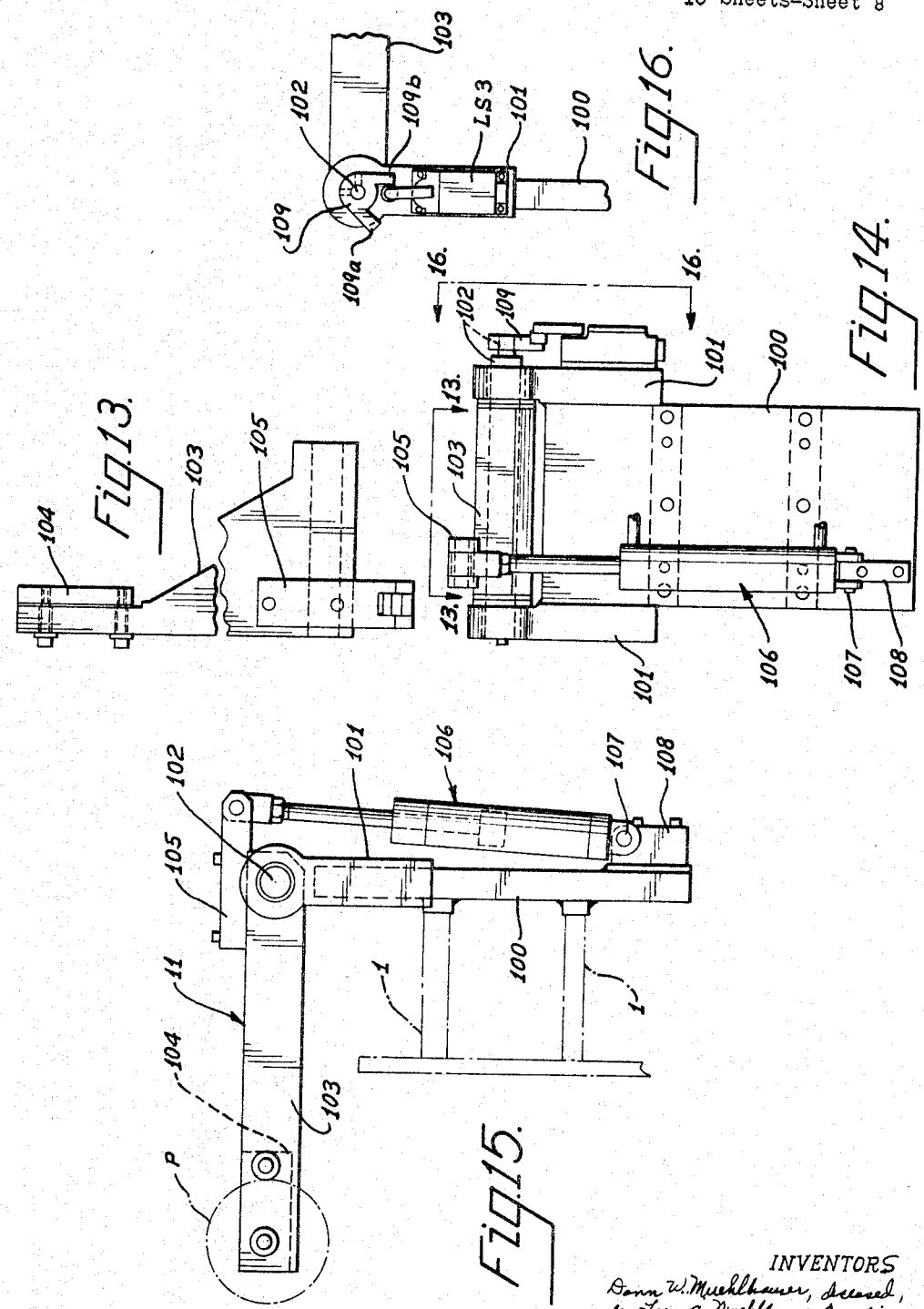

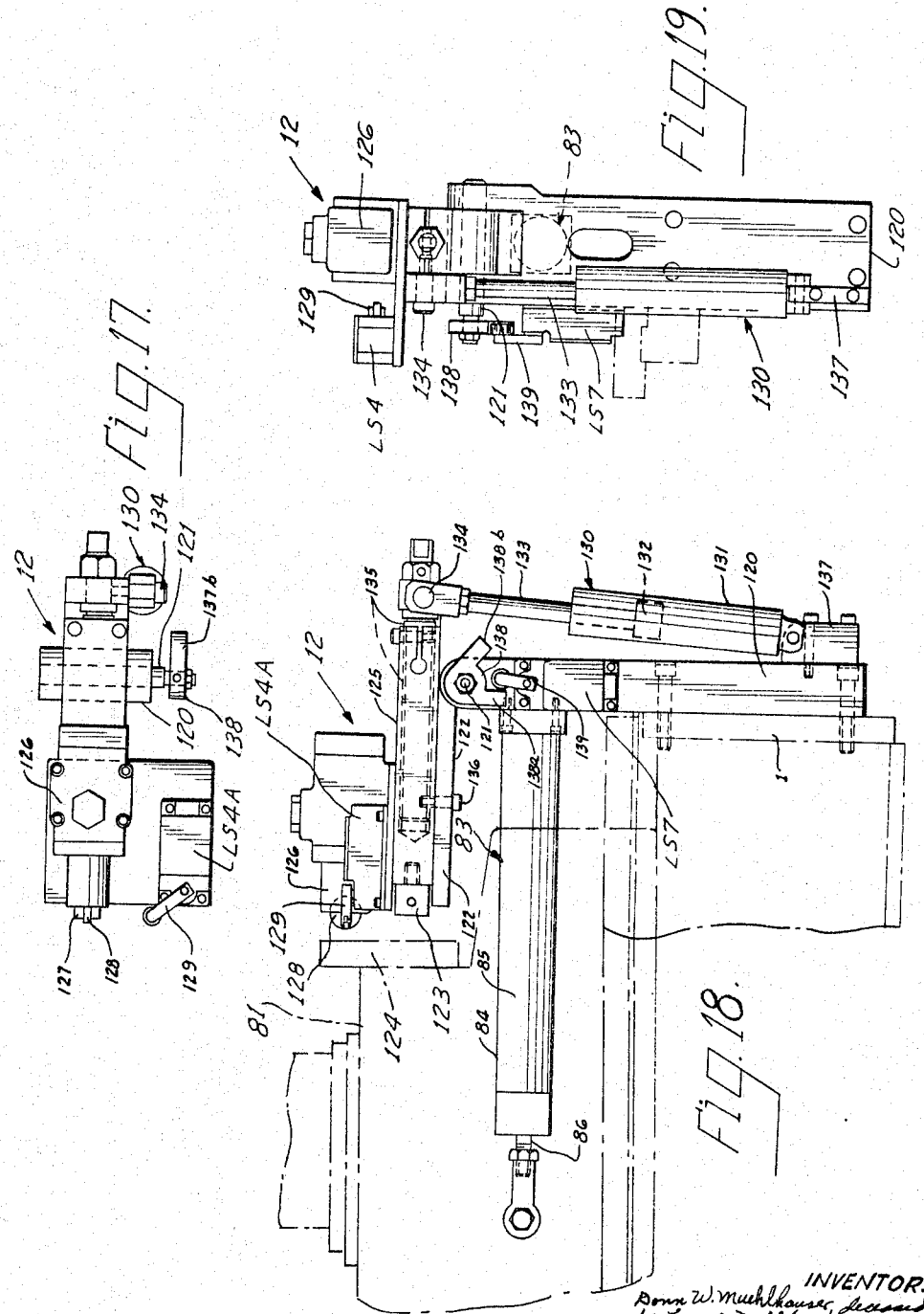

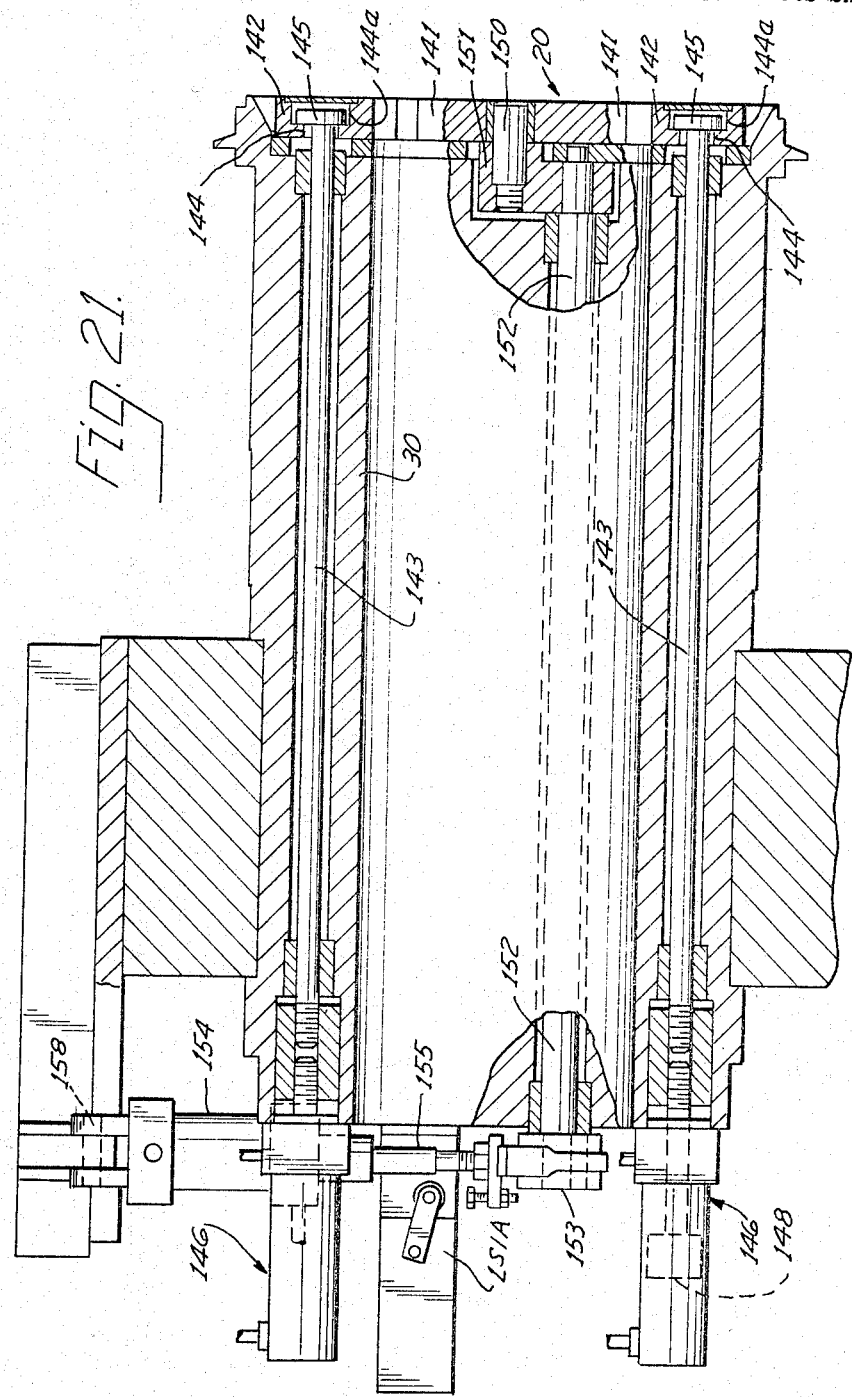

Oct. 4, 1966  J. R. FOTHERINGHAM ETAL  3,276,301
CUT OFF MACHINE FOR CUTTING ELONGATED STOCK INTO BLANKS
Filed Nov. 9, 1964
15 Sheets-Sheet 12

INVENTORS
Donn W. Muehlhauser, deceased
by Lois A. Muehlhauser, Executrix,
James R. Fotheringham, &
Casimir J. Kacperski,
by: John H. Lronson,
their ATTORNEY.

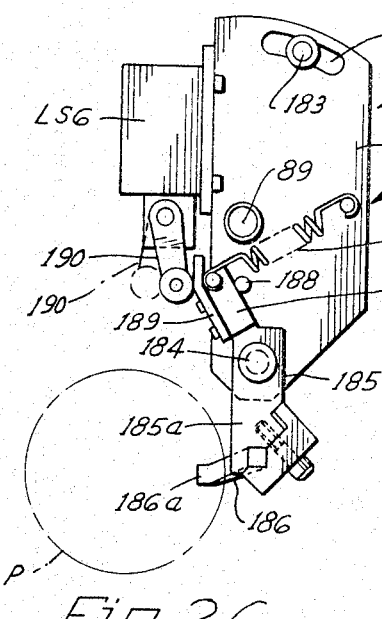
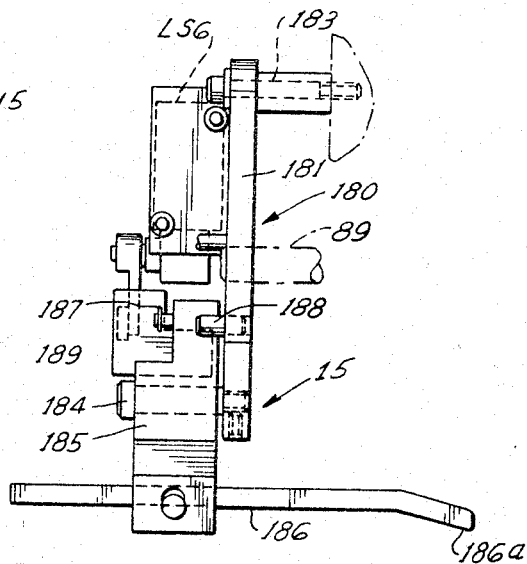
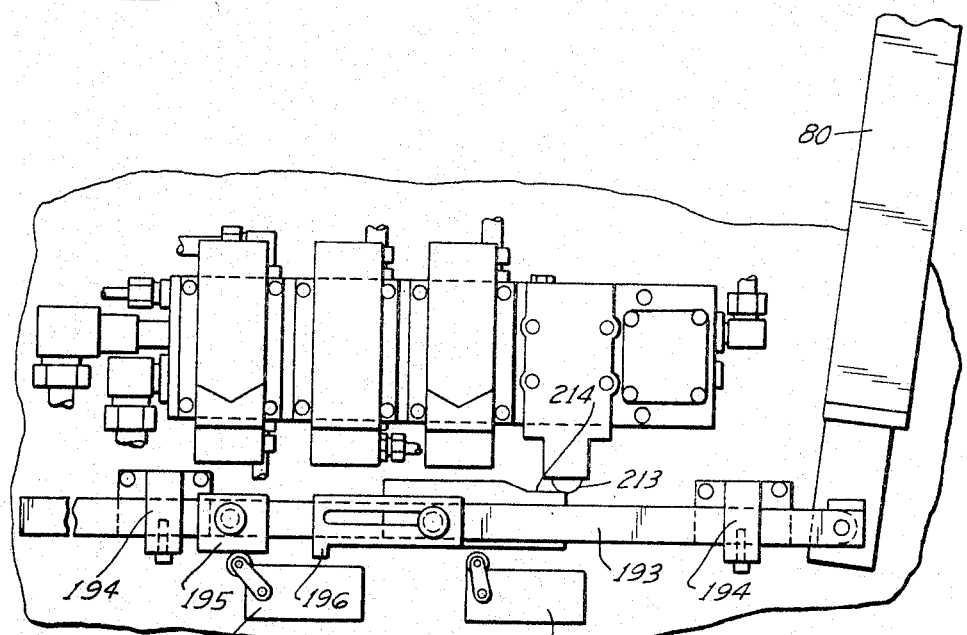

Oct. 4, 1966  J. R. FOTHERINGHAM ETAL  3,276,301
CUT OFF MACHINE FOR CUTTING ELONGATED STOCK INTO BLANKS
Filed Nov. 9, 1964
15 Sheets-Sheet 14

INVENTORS
Donn W. Muehlhauser, deceased,
By Lois A. Muehlhauser, Executrix,
James R. Fotheringham, +
Casimir J. Kacperski,
By John H. Rumas, ATTORNEY
Their

United States Patent Office 3,276,301
Patented Oct. 4, 1966

3,276,301
CUT OFF MACHINE FOR CUTTING ELONGATED STOCK INTO BLANKS
James R. Fotheringham, Willowick, and Casimir J. Kacperski, Wickliffe, Ohio, and Donn W. Muehlhauser, deceased, late of Euclid, Ohio, by Lois A. Muehlhauser, executrix, Euclid, Ohio, assignors to The Pipe Machinery Company, Wickliffe, Ohio, a corporation of Ohio
Filed Nov. 9, 1964, Ser. No. 410,021
14 Claims. (Cl. 82—70.2)

This invention relates to a cut off machine for cutting elongated stock into blanks of accurate length, and particularly to cutting thick walled pipes into blanks which are of precisely equal lengths and are suitable for machining into pipe couplings.

One of the principal objects of the present invention is to feed or advance a length of pipe endwise intermittently, stop the length of pipe accurately in position axially after each advance to assure a precise length of the severed blank, center the pipe radially in the advanced position, hold it rigidly in position both radially and axially and, while it is so held, cutting off blanks, each advance and holding of the pipe being such that the cut off blanks are substantially identical in length.

Another object is to hold each severed blank in a manner such that it cannot become displaced and interfere in any manner with the proper operation of the cutting tools and precise successive advances of the pipe axially.

Another object is to provide a feeding chuck and co-operating mechanism such that, when the remnant of the length of pipe at the trailing end of the pipe is too short for a blank of proper length, the remnant is disposed of by the machine so as not to interfere with the cutting operation or the introduction of the next succeeding length of pipe into the machine.

A specific object is to provide a machine which automatically loads and positions lengths of pipe successively, faces the leading end of each, cuts each into successive blanks of substantially identical length, disposes of the trailing remnant of each, reloads, and repeats the cycle.

Various other objects and advantages will become apparent from the following description wherein reference is made to the drawings in which:

FIG. 5 is a right end elevation of the rotary cutting head of the machine illustrated in FIG. 1;

FIG. 6 is a vertical sectional view of the rotary head and is taken on the line 6—6 in FIG. 5, part thereof being shown in elevation for clearness in illustration;

FIG. 7 is a fragmentary view taken as indicated by line 7—7 in FIG. 5, showing one of the tool carriages and its mounting in the head;

FIG. 8b is a vertical sectional view of the wedge track taken on the line 8b—8b in FIG. 8a;

FIG. 9 is an enlarged fragmentary front elevation of a portion of the rotary head illustrated in FIGS. 1, 2, 5 and 6, showing the mechanism for advancing and retracting the cutting tool carriages of the head;

FIG. 10 is a fragmentary right end elevation of the structure illustrated in FIG. 9;

FIG. 11 is an enlarged fragmentary front elevation of the machine illustrated in FIGS. 1 and 2, showing the feed chuck, the facing stop in raised position, the pipe length detector, and the stock restraining mechanism thereof;

FIG. 12 is a fragmentary left end elevation of the feed chuck and facing stop illustrated in FIG. 11, the pipe length detector, and the pipe restrainer being omitted for clearness in illustration;

FIG. 13 is a top plan view of the facing stop of the present invention;

FIG. 14 is a front elevation of the facing stop illustrated in FIG. 1;

FIG. 15 is a left end elevation of the facing stop illustrated in FIGS. 13 and 14;

FIG. 16 is a fragmentary right end elevation of a portion of the stop illustrated in FIGS. 13–15, showing a control limit switch operated thereby;

FIG. 17 is a top plan view of the blank length selecting stop of the present invention;

FIG. 18 is a front elevation of the stop of FIG. 17;

FIG. 19 is a right end elevation of the stop of FIG. 17;

FIG. 21 is a fragmentary longitudinal vertical sectional view showing the floating chuck in greater detail, and is taken on the line 21—21 of FIG. 20;

FIG. 25 is a fragmentary front elevation of the feeding chuck with a remnant detector of the present invention installed therein, part thereof being shown in section for clearness in illustration;

FIG. 26 is a right end elevation of the structure illustrated in FIG. 25;

FIG. 27 is a fragmentary front elevation of the machine of FIGS. 1 through 3 showing a yoke arm of the tool advancing mechanism of the rotary head and a cam bar operated thereby for causing operation of certain switches used in effecting the automatic operation;

Figure 1:
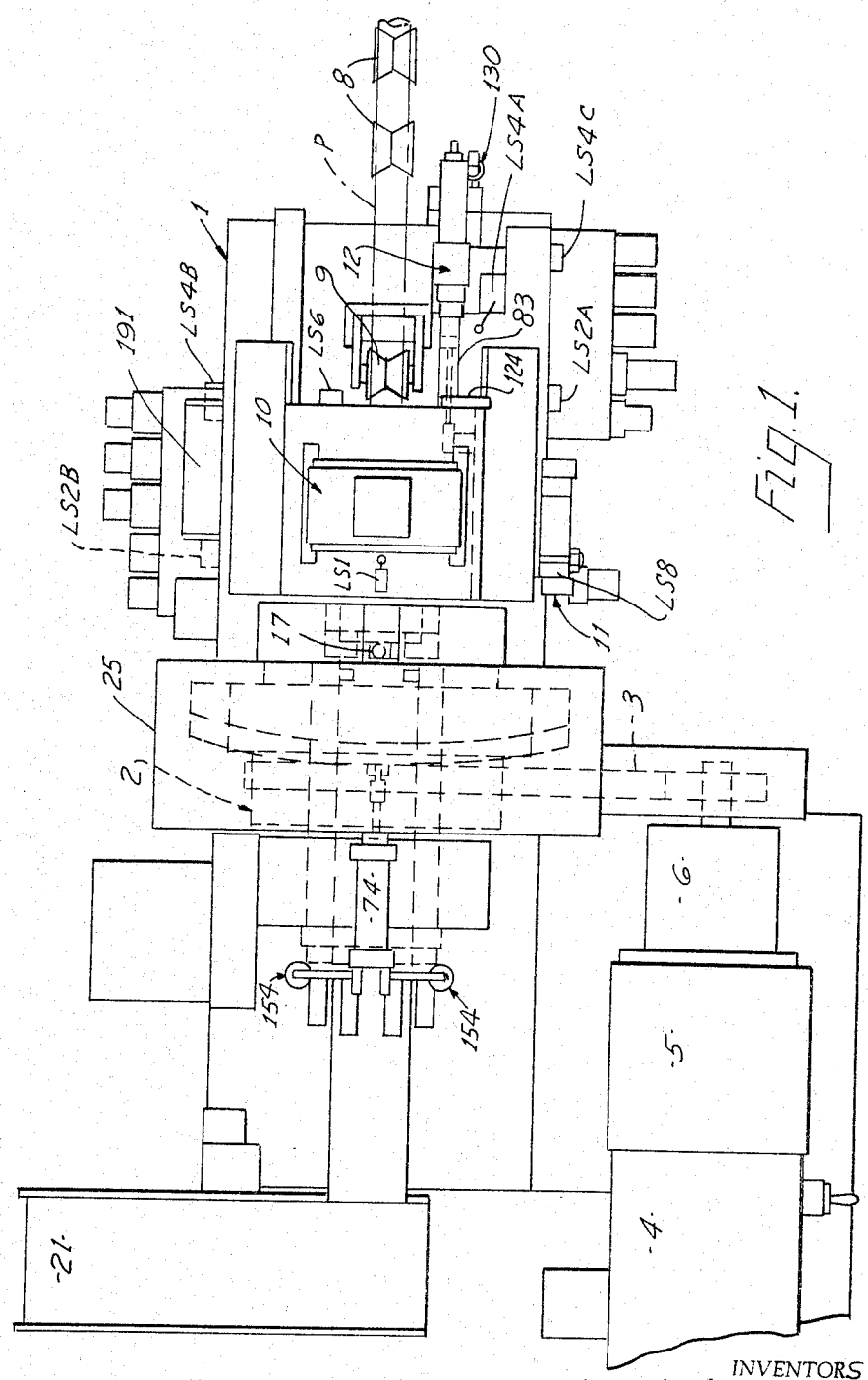
FIG. 1 is a top plan view of a machine embodying the principles of the present invention.

For purposes of illustration the invention is disclosed in its preferred form which is for cutting off lengths of pipe to form coupling blanks. Its use for other purposes will be readily apparent from the illustrative example.

Referring first to FIGS. 1 through 4, the machine comprises generally a supporting frame 1 on which is mounted a power driven rotary head assemblage 2 which carries cut off tools for cutting off lengths of stock. The assemblage 2 is driven by a conventional notched timing belt 3 which, in turn, is driven by an electric motor 4 through a variable speed drive 5 including a gear box 6. The machine is shown as arranged so that stock fed to the assemblage 2 is fed in a direction from right to left in FIGS. 1 and 2.

A length of pipe P is fed endwise to the assemblage 2 by means of live feed rolls 8 onto which the pipe is fed by the live feed rolls of a transfer rack onto which lengths of pipe are fed successively transversely of their axes from a suitable loading skid. The transfer rack and manner of feeding pipe thereonto may be such as disclosed in Thompson et al. United States Letters Patent No. 2,690,572, issued October 5, 1954.

The pipe P passes from the feed rolls 8 onto an idler roll 9 and therefrom passes axially along a positioning rest, later to be described, to a stock feed chuck 10. The chuck 10 is reciprocable endwise of the frame 1 to selected retracted starting positions and to an advanced forward cutting position in which the pipe is in proper position for cutting by the tools of the assemblage 2.

A facing stop 11 is provided and is movable to an operating position wherein it lies in the path of the forward end of the advancing pipe at a location, endwise of the pipe, between the chuck 10 and assemblage 2. The stop 11 is retractable out of the pipe path to an idle position. In operation, the facing stop 11 is moved into the path of the pipe advancing only once for each pipe and that is when the original leading end of the pipe is to be presented to the assemblage 2 for a facing cut. It is so moved when the chuck 10 is in a retracted position.

A coupling length stop 12 is arranged to be moved into the path of the chuck 10 at the rear end of the chuck, which end is opposite from the end adjacent the assemblage 2 so as to be engaged by the chuck 10 for stopping the chuck 10 in a selected retracted starting poistion which is chosen in accordance with the length of coupling required.

Each pipe is initially introduced into the machine when the stop 12 is retracted out of the path of the chuck 10 and the chuck 10 is in a remnant disposal position in which the chuck is retracted beyond its normal starting position which is ordinarily determined by the stop 12. The pipe P is fed endwise by the rolls 8 initially into the machine through the open jaws of the retracted chuck 10 until its original leading end strikes the stop 11. This arrests travel of the pipe toward the assemblage 2 in a facing starting position. This pipe position is such that when the stop 11 is removed from the pipe path and the feed chuck 10, in its retracted remnant disposal position, grips the pipe and then advances, the chuck 10 advances the pipe only far enough so that the tools of the assemblage 2 make only a facing cut on the original leading end of the pipe P. This assures that the original leading end is planar and normal to the rotational axis of the assemblage 2 preparatory to begin the cutting of the pipe into coupling blanks.

After the initial facing out, the faced leading end of the pipe is in exactly the same position as will be the successive instantaneous leading ends of the remainder of the pipe resulting from completion of the successive cut offs of blanks, respectively.

The stop 12 is adjusted axially endwise of the pipe in accordance with the length of the coupling blank to be cut off. Consequently, assuming the pipe remains unmoved axially each time the open chuck 10 is retracted against the stop 12, after the original facing cut and after each successive cut, and then closed the pipe will be advanced exactly the same distance for each cycle of advance of the chuck 10 after the facing cut. Successive retraction and advance of the chuck 10 in this manner continues automatically until all of the pipe P has been cut into blanks of proper length and only a remnant too short for a blank remains.

The remnant remaining is of insufficient length for a blank, a sensing device 15 senses this condition and thereupon causes the stop 12 to move to an inoperative position. The chuck 10 then is retracted beyond the normal starting retracted position to the remnant disposal, or more retracted, position and therein releases the remnant which then drops into a disposal trough 16.

Necessarily the pipe P must be held fixedly in axial and radial position during retraction of the chuck 10 if blanks of accurate length are to be obtained. For this purpose, a pipe restrainer 17 is provided. This restrainer is effective to press down on the pipe and hold it sufficiently tightly against a suitable rest or undersupport 18 so that, as the chuck 10 is retracted, the pipe cannot be dragged back by frictional engagement of the open jaws of the chuck 10 should they happen not to be fully released from the pipe when retraction of the chuck 10 begins. The same holding force prevents the pipe from twisting when the grip of the chuck 10 is being relaxed and released. The restrainer 17 becomes operative to hold the pipe after the chuck 10 has been fully advanced and before it has been released. The restrainer 17 remains operative until the remainder of the pipe has been firmly gripped by the chuck 10 in the retracted starting position of the chuck against the stop 12. It retracts before the leading end of the remainder of the pipe is advanced by the chuck 10 as far as the restrainer.

It is desirable that each portion of the pipe being cut off as a coupling blank be held at the side of the path of the cutting tools of the head 2 opposite from the feed chuck 10. For this purpose, a coupling or floating jaw chuck 20 is provided. The jaws of the floating chuck engage the portion of the pipe, just beyond the path of the tools of the assemblage 2 in the feed or advance direction, while the jaws are floating. Their closure on the pipe centers them on the pipe. They are then locked against floating in their centered position on the pipe. Thus the pipe is firmly gripped close to the path of the cutting tools both in advance and to the rear of the path of the tools. Consequently, there is no danger of a cut off coupling blank shifting position and interfering with the cutter.

The blank 20 remains in gripping relation to the cut off blank until the next succeeding feed of the chuck 10 moves the leading end of the remainder of the pipe beyond the path of the cutting tools of assemblage 2, and closely adjacent to, against, the trailing end of the cut off blank held in the chuck 20. Thereupon the chuck 20 releases the cut off blank so that it may be pushed on through the assemblage 2 by the oncoming leading end of the pipe remainder, and drop into a suitable discharge chute 21 for discharge into a bin. Thus the cut off blanks cannot accidentally be jarred against the cutting tools.

Having thus briefly described the machine in its broader aspects, the various parts and mechanisms broadly described above are next referred to in detail.

*Rotary cutting head*

Figure 2:
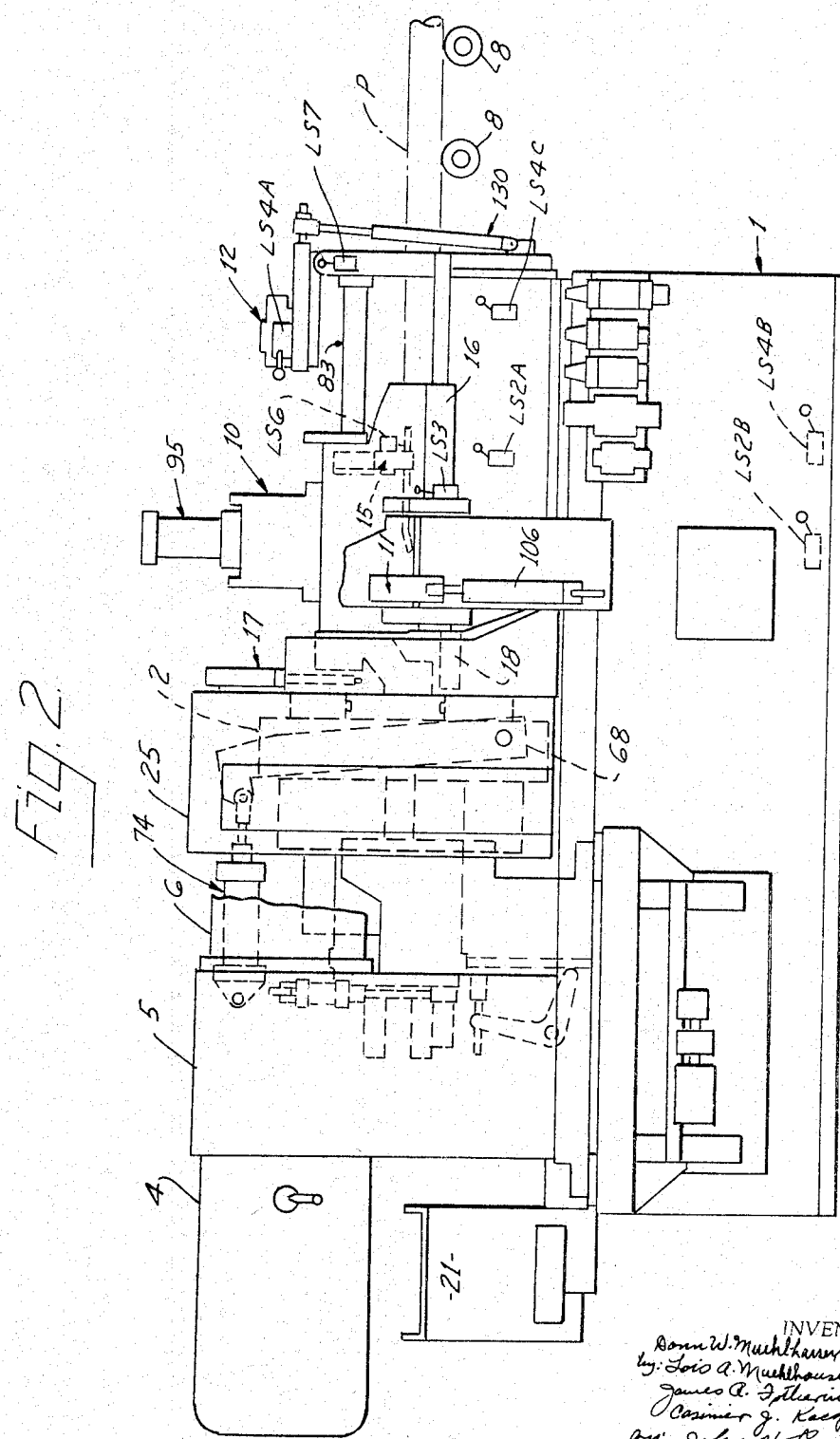
FIG. 2 is a front elevation of the machine illustrated in FIG. 1.
Figure 3:
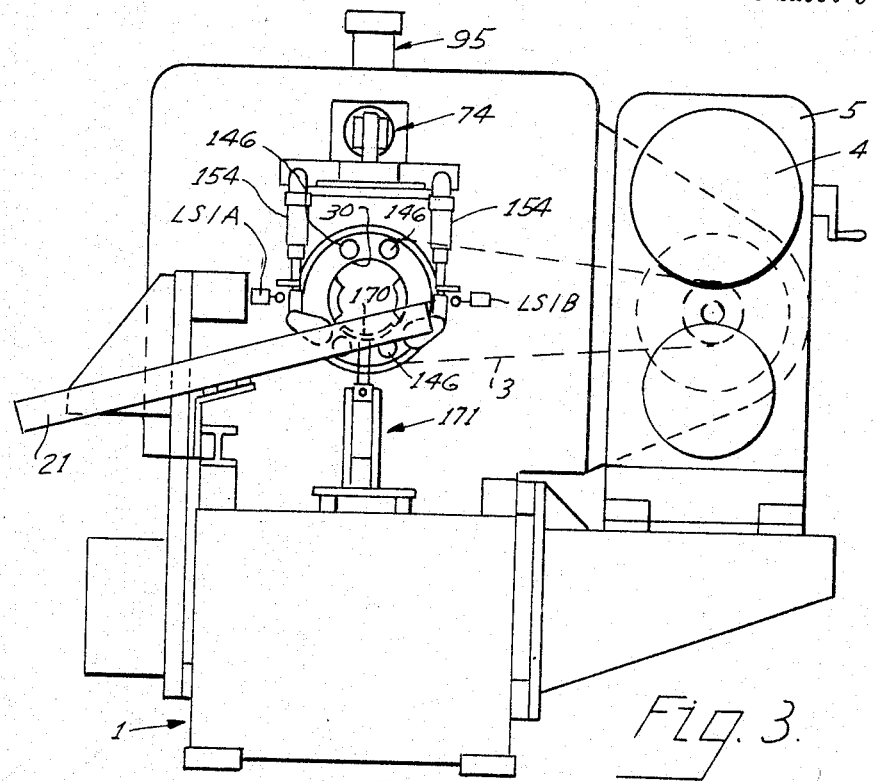
FIG. 3 is a left end elevation of the machine illustrated in FIGS. 1 and 2.
Figure 4:
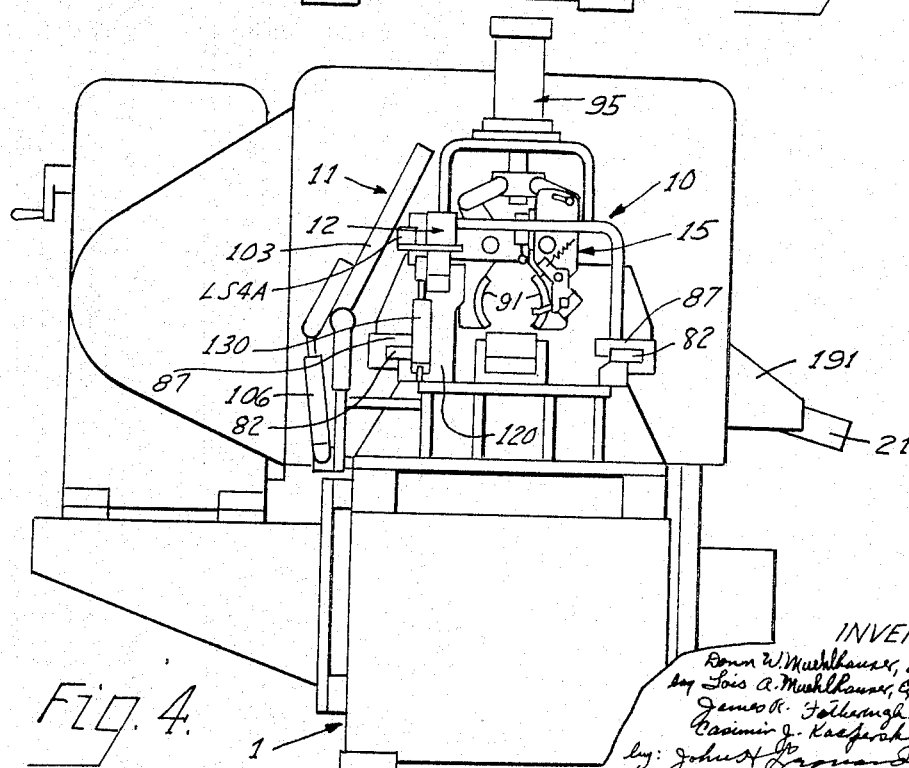
FIG. 4 is a right end elevation of the machine illustrated in FIGS. 1 through 3.
Figure 8A:
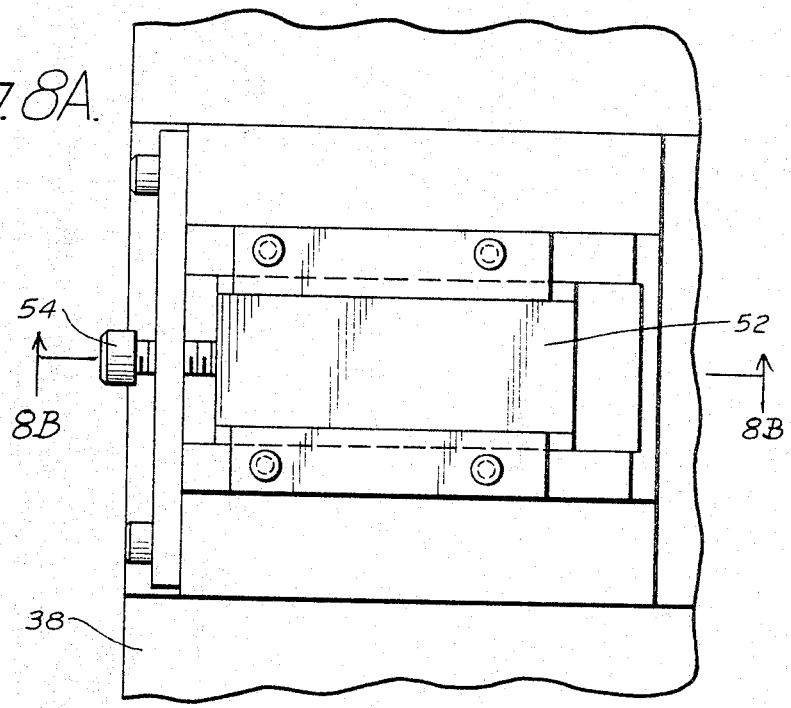
FIG. 8a is an enlarged fragmentary plan view, as viewed from line 8a—8a in FIG. 6, of a portion of the wedge track used for adjusting the tool carriages in the head.
Figure 8B:
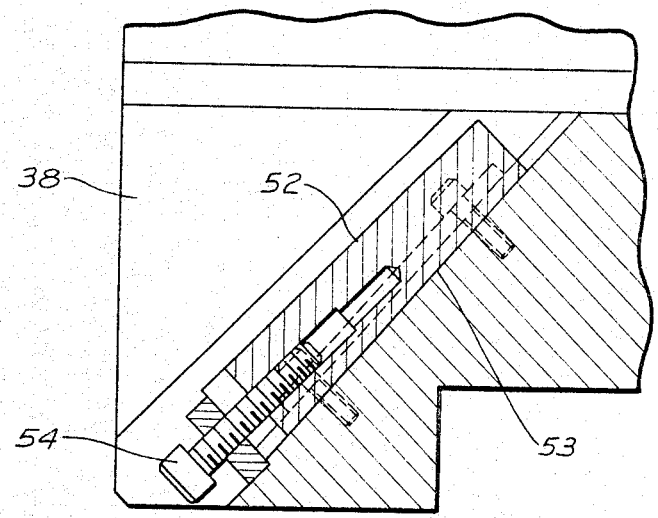
Figure 22:
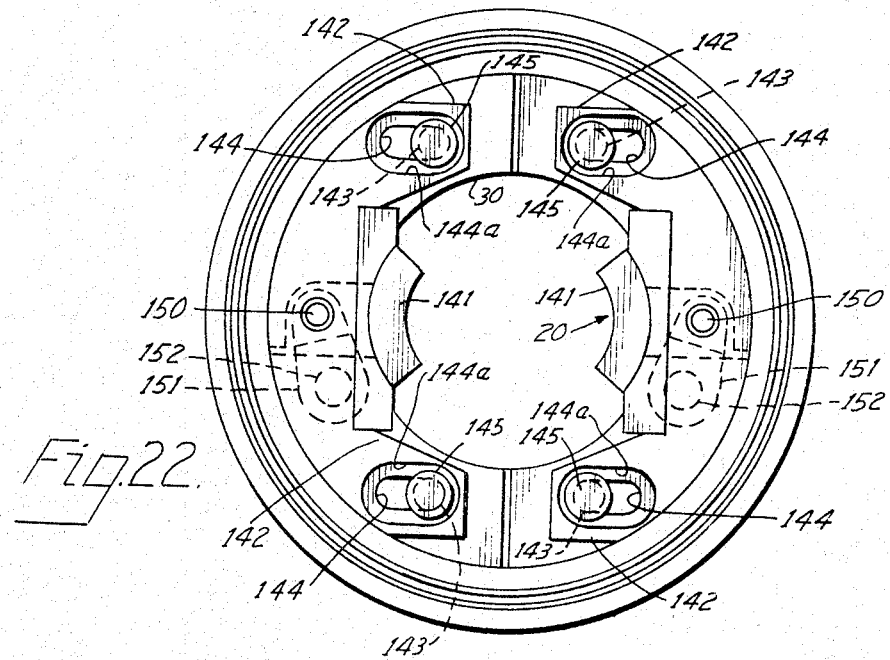
FIG. 22 is a fragmentary right end elevation of the floating chuck structure illustrated in FIGS. 20 and 21.
Figure 20:
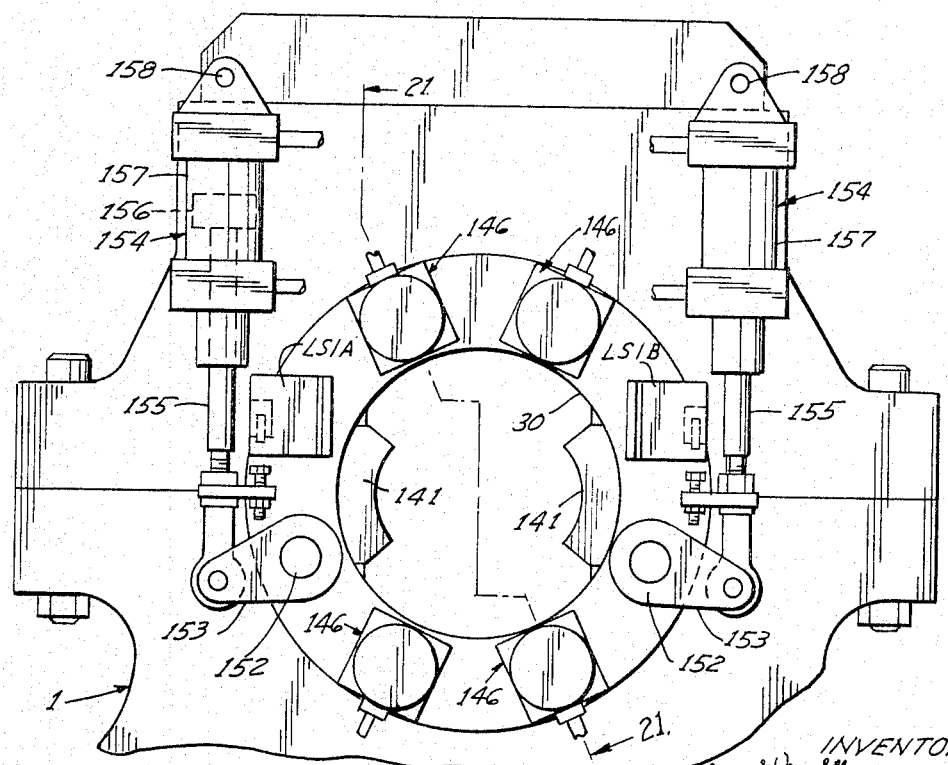
FIG. 20 is a fragmentary enlarged left end elevation of the coupling floating chuck illustrated in the machine in FIGS. 1 through 3, showing the operating mechanism thereof.
Figure 24:
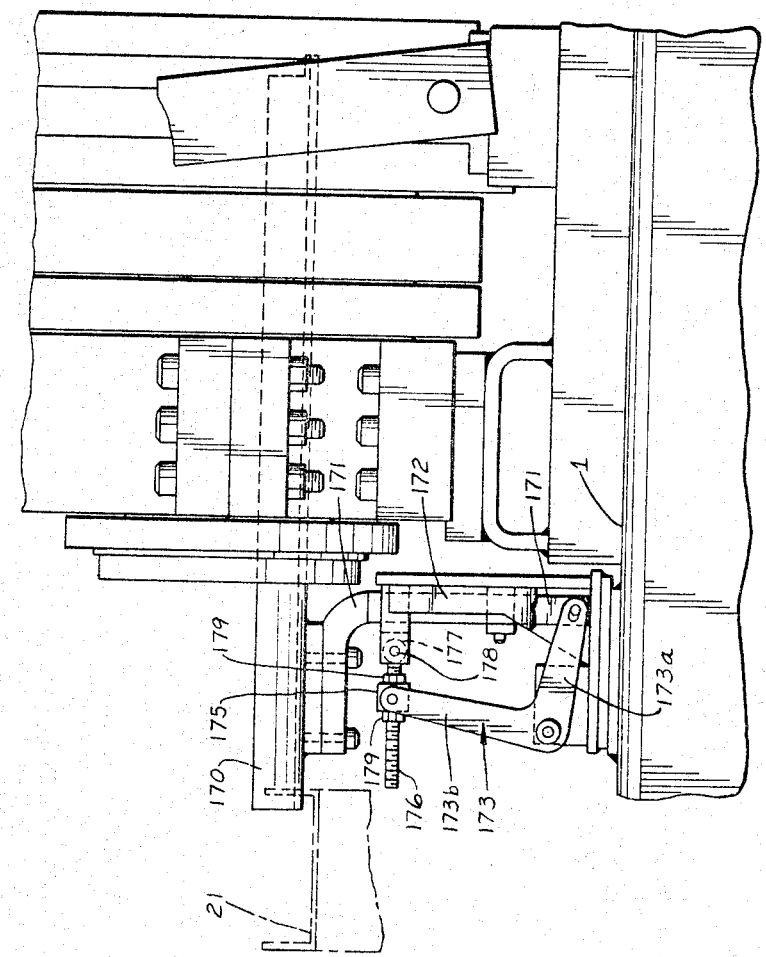
FIG. 24 is a fragmentary front elevation of the structure illustrated in FIG. 23.
Figure 23:
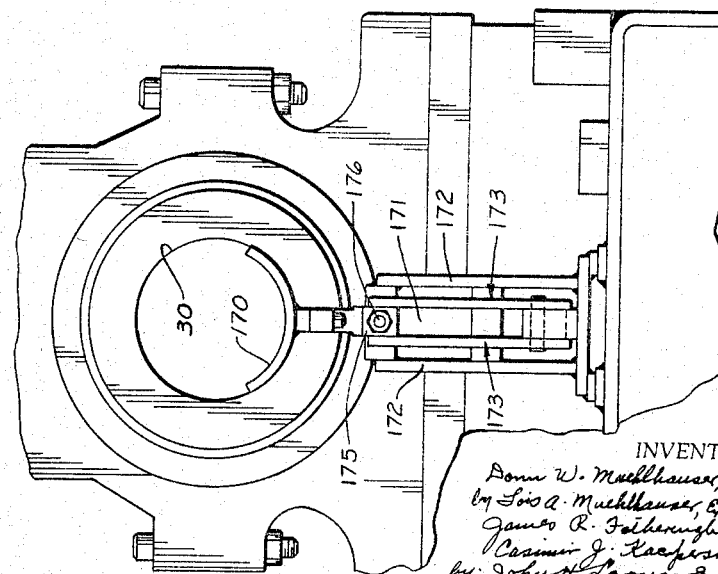
FIG. 23 is an enlarged fragmentary left end elevation, similar to FIG. 20, but showing the coupling discharge trough and height adjusting mechanism therefor.

The rotary cutting head 2 is best illustrated in FIGS. 5 and 6. The rotary parts of the head assemblage 2 are enclosed in a suitable protective casing 25 which is shown in FIGS. 1 and 2, but is omitted in FIGS. 5 and 6 for clearness.

The head assemblage 2 comprises essentially a horizontal open ended stationary tubular body 30 through which the pipe may pass axially. Mounted on the exterior of the tubular body 30 on sets of anti-friction roller bearings 31 and 32 is a rotary tool head 33 which is provided with a suitable pulley 34 of the tooth type through which it is driven by the timing belt 3 for rotating the head 33 and its cuttnig tools about the pipe axis. A pair of tool carriages 35, carry cutting tools 36, respectively, and are mounted in radial slideways 37 in the head 33 for reciprocation in fixed radial paths relative to the head 33 so that they can be advanced toward, and retracted from, the axis of rotation of the head 33 for effecting the cutting operation.

For advancing and retracting the carriages 35, a ring 38 is supported on the head 33 by sets 39 of preloaded roller bearings of the recirculating type such, for example, as described in United States Letters Patent No. 3,003,828, issued on October 10, 1961, to James A. Stark. The sets of bearings support the ring 38 in coaxial, radially spaced relation to the head 33 for rotation therewith and for axial movement relative thereto. Since the carriages 35 are the same in form and function, only one will be described in detail.

The carriage 35 is pivotally connected at its radially outer end to a link 42. The other end of the link 42 is pivotally connected by a pivot 43 to one arm 44a of a rocker 44 having arms 44a and 44b. The rocker 44, in turn, is pivotally connected by a pivot 45 to the rotary head 33, the pivot 45 extending chordally of the rotary head 33. The other arm 44b is connected by a pivot 46 to a link 47 which, in turn, is connected to a counterbalance 48 for counterbalancing the centrifugal forces imposed by the carriages 35 when they are rotated by the head 33.

For rocking the rocker 44 to effect radial advance and retraction of the associated carriage 35, suitable rollers 49 and 50 are mounted on the pivots 43 and 46, respectively. The rollers 49 and 50 roll on cam tracks 51 and 52, respectively, which are convergent in a direction generally toward the axis of the pivot 45. One of the tracks may be stationary, but the other is adjustable for preloading both rollers 49 and 50 and the pivot 45 to eliminate slack.

In the form illustrated, the track 51 is fixedly mounted in a suitable notch or cut-out in the ring 38. The track 52, however, is mounted in a slideway 53 in the ring 38. The slideway 53 extends generally toward the axis of the pivot 45. The track 52 is movable along the slideway by an adjusting screw 54. Its roller engaging face slopes toward the slideway 53 from its outermost end to its innermost end as illustrated in FIG. 6. Thus, in longitudinal section in a plane normal to the roller face, the track 52 is in the form of a wedge with its thinner end nearest the pivot 45. Consequently, as the track 52 is moved toward the pivot 45, its roller engaging surface forces the roller 50 to rock the rocker 44 clockwise, in FIG. 6, thereby forcing the roller 49 more firmly against its track 51. By adjusting the track 52 in this manner, both the rollers 49 and 50 and pivot 45 are preloaded and slack is removed from this driving connection.

To assure that the bearings 31 and 32 have a snug fit, the inner race of bearing 32 is fixed in position on the tubular body 30. The inner race of the bearing 31, however, is slidable axially along the body 30.

Mounted on the tubular body 30 for movement endwise thereof is an annular slide 56 which engages the adjacent end of the inner race of the bearing 31 for imposing pressure thereagainst to force it toward the bearing 32, thus assuring proper tightness of fit of both sets of bearings 31 and 32. In order to move the slide 56, stationary blocks 57 are mounted in spaced relation about the circumference of the body 30, preferably about eight such blocks being provided. Mounted in each block is a slide rod 58, one end of which engages the slide 56 and the other end of which extends to the left beyond the left end of the associated block 57. A ring nut 59 is threaded on the body 30 so that it can be adjusted toward and away from the outer ends of the blocks 57 by rotation about the axis of the body 30. The ring nut 59 can be locked in the axially adjusted position by means of radially extending bronze lock pins or members 60, driven by screws 61, respectively. The ring nut 59 is also provided with a number of threaded passages 62 through which extend set screws 63, respectively. These passages are aligned with the rods 58 and the set screws 63 are operated, in turn, to move the rods 58 and thereby move the slide 56 and inner race of the bearing 31 to the proper position axially. Thereupon the set screws are backed off from the rods 58 and the ring 59 is rotated so that it bears against the adjacent ends of the rods 58 and holds them in position for holding the inner race of the bearing 31 in proper position.

In order to move the ring 38 forwardly and rearwardly, during the rotation of the head 33, for advancing and retracting the tool carriages 35, the ring 38 is provided with an external peripheral groove 65. As illustrated in FIGS. 9 and 10, spaced supporting brackets 66 are mounted on the frame of the machine and carry coaxial pivots 67 which rockably support an inverted yoke 68. The yoke 68 has upper arm portions 69 which are connected at the top and carry a suitable bearing member 70. The bearing member 70 is connected to a piston rod 71 of a piston 72. The piston operates in a cylinder 73 of a reversible hydraulic piston and cylinder assemblage 74. The cylinder 73 is fixedly connected to a frame portion of the machine. By reversing the admission of pressure fluid to the ends of the assemblage 74, the yoke 68 can be rocked about the axis of the pivots 67.

The yoke is connected to the ring 38 by followers 76 mounted on the yoke operating in the groove 65. It is desirable that the connection between the yoke and ring be preloaded. For this purpose, the followers 76 are pivotally connected to the yoke at opposite sides of the yoke for rocking about coaxial pivots 77 which extend diametrally of the groove 65 and head 33. Each follower 76 carries three rollers 78a, 78b, and 78c with their axes extending generally radially of the groove 65. These rollers are of sufficient size to fit between the sides of the groove 65 with substantial operating clearance. The roller 78a is mounted on one end 79a of a pivot pin 79 which has a mid-portion 79b, eccentric to the portion 79a and mounted in the follower 76, so that, by rotation of the pin 79, the roller 78a can be moved crosswise of the slot 65. The follower 76 is disposed outside of the groove 65 and its rollers are disposed in the groove 65. By rotating the pin 79, the roller 78a is moved transversely of the slot 65, for example, in a direction to the right in FIG. 9. The roller 78a engages the right peripheral side wall of the groove 65, thus forcing the yoke 65 counter-clockwise about its pivot 67 and thereby pressing the roller 78b against the left hand side wall of the groove. When the roller 78b strikes the left hand side wall, the follower 76 rocks about the axis of the roller 78b thus throwing the roller 78c into firm pressure contact with the right hand side wall of the slot 65. Hence the two outer rollers 78a and 78c are forced firmly against the right hand side wall of the groove 65 and the roller 78b against the left hand side wall, so that the connection is preloaded to eliminate slack. Obviously, the adjustment could be reversed, but it is preferable that the outer rollers engage the right hand side wall because that is the one through which force is applied for advancing the tools.

Thus by adjusting the eccentric pivot of the roller 78a, the rollers 78a, 78b and 78c themselves can be preloaded in the groove and on their respective pivots and, in turn, thereby preload the associated yoke relative to its pivots 67.

With the preloading hereinbefore described, very high speed operation, free from chatter, can be obtained, thereby making practical the use of high speed carbide chasers.

The yoke 68 is provided with a lateral extension arm 80 which cooperates with, and drives, a cam bar for operating in the proper sequence certain limit switches used in timing the operation of the machine, as will later be described.

Thus it will be seen that by rocking the yoke 68 clockwise in FIG. 9, the ring 38 will be moved to the right thereby moving the carriages 35 inwardly toward the axis for causing the tools to make the cut.

Stock feed chuck

Referring next to FIGS. 1, 2, 11, and 12, the stock feed chuck 10 has a body 81 mounted on slideways 82 on the frame of the machine for movement toward and away from the tool head assemblage 2. The chuck 10 is advanced and retracted by a reversible hydraulic piston and cylinder assemblage 83. The assemblage includes a cylinder 84, connected to the machine frame, and a piston 85 reciprocable therein and having a rod 86 which is pivotally connected to a suitable boss on the body 81 of the chuck 10. The body 81 preferably is in the form of an inverted channel which opens downwardly and is provided with complementary slides 87 for cooperation with the slideways 82 on the frame 1.

The body 81 has bores 88, located above the level of the ways 82, for rockably supporting rock shafts 89, each of which carries a gripping jaw 90. Each jaw 90 is fixed on its associated rock shaft 89 and has a gripping face 91 below the level of the associated rock shaft. The shafts 89 are provided with rocker arms 92, respectively, which extend generally upwardly to a level above the shafts. The arms 92 are pivotally connected to links 93, respectively, and the links 93, in turn, are connected to an operating head 94. The operating head 94 is driven by a reversible hydraulic piston and cylinder assemblage 95, including a cylinder 96 and a piston 97 reciprocable therein and having a rod 98 which is connected to the head 94. The piston and cylinder assemblage 95 is reversible for opening and closing the jaws 89, as will later be described.

In this connection it is to be noted that the jaws 90 are suspended from above so that, when they are opened, the pipe which was being gripped and supported by the jaws, is released and can drop by gravity downwardly between the slideways 82, free and clear of any portion of the chuck 10. This arrangement provides for expeditious discharge of a remnant portion of the trailing end of the pipe, as will later be described.

Also, the jaws 90 overhang the forward end of the chuck body, and due to the relation and their suspension from above, chips can readily drop downwardly and escape therepast from the cutting site.

*Facing stop*

Referring next to FIGS. 13 through 15, the facing stop 11 is illustrated in detail.

As there shown, an upright bracket 100 having yoke arms 101 is mounted on the machine frame 1. A rock shaft 102 is rockably supported by the yoke arms 101 and, in turn, carries a stop arm 103, the outer end of which carries an electric contact stop plate 104. The arm 103 is connected to the rock shaft 102 for rocking therewith in a vertical plane extending transversely of the pipe path or axis of the rotary assemblage 2. For rocking the arm 103 and shaft 102, a suitable bracket 105 is connected to the arm 103 and, in turn, is connected to a reversible hydraulic piston and cylinder assemblage 106. The cylinder of the assemblage 106 is pivotally connected by a pivot 107 to a suitable supporting member 108 on the bracket 100. By introducing pressure fluid to the rod end of the cylinder, the arm 103 is swung upwardly out of the path of the pipe and of the chuck 10, and when the pressure fluid is admitted to the opposite end of the assemblage 106, the stop arm 103 is lowered to stop position in the path of the pipe and chuck 10.

The plate 104 is adapted to be engaged by the leading end of the pipe for stopping it in the proper position for feeding on the initial facing stroke and for completing an electric control circuit, later to be described, when the arm 103 is in its lowered position.

It is to be noted that the jaws 90 are disposed at the leading face of the chuck 10, so that, as illustrated in FIG. 1, the chuck 10 can be moved forwardly to a position such that its leading or forward end and the leading or forward end of the jaws 90 are substantially at the plane of the path of the cutters of the head 2. Consequently, the stock to be faced is gripped very close to the plane in which the facing cut is to be made.

In FIG. 1, the facing stop 11 has been moved to an inoperative position and the feed chuck 10 is shown in an advanced position. Upon retraction of the feed chuck 10 to its normal starting position, there is ample room between the forward ends of the jaws 90 of the feed chuck 10 and the rotary head assemblage 2 to permit the disposition of the stop arm 103 therebetween so that the plate 104 is in alignment with the oncoming end of the pipe.

Mounted on the rock shaft 102 for rocking therewith is a switch operating element 109 having arms 109a and 109b which are arranged to engage a pivoted switch lever 110 of a limit switch, designated $LS_3$, for causing a control function later to be described. As mentioned, the facing stop 11 is arranged to be moved into the path of the pipe to stop the leading end of the original length of pipe at a position such that, when the feed chuck 10 is retracted to its remnant disposal position and there grips the pipe, and then is moved forwardly to its advanced cutting position, the pipe is advanced just enough to position the leading end for a facing cut only.

*Coupling length stop*

After the facing cut, it is necessary for the chuck 10, upon each successive retraction and advance of the feed chuck 10, to feed an exact length of stock required for the particular length of coupling blank being cut. For this purpose, the coupling length stop 12 is provided.

The coupling length stop 12, best illustrated in FIGS. 17 through 19, comprises a bracket 120 mounted in fixed position on the frame 1 of the machine. Mounted at the upper end of the bracket 120 is a rock shaft 121 on which is carried, for rocking therewith, a platform 122. Carried on the platform 122 for movement therewith is a bumper 123 which is engageable by a suitable bumper plate 124 on the body of the feed chuck 10 when the bumper is in operating position and the feed chuck is moved to its retracted starting position. The bumper 123 is mounted on a body 125 which is supported on the platform 122 for adjustment endwise of the path of travel of the pipe so that different starting positions of the chuck 10 can be selected and thereby different selected lengths of couplings can be cut off from the pipe. Also mounted on the platform 122 is a hydraulic shock absorber in the form of a throttling valve 126 for relieving the shock due to stopping the rapid retraction of the feed chuck 10 by the stop 12. The shock absorber includes a plunger 127 carrying a roller 128 which is engaged by a bumper plate 124 on the chuck 10 a fraction of an inch before the plate 124 engages the bumper 123.

It is desirable to relieve the shock due to impact of the chuck 10 against the stop 12. For this purpose, the valve 126 is normally open and is in closed position when the bumper 123 is struck and moved by the bumper plate 124 on the retracting chuck 10. Closure of the valve 126 occurs when the chuck 10 moves to within a small fraction of an inch from the stop 12, and the normal compression of the fluid in the head end of the assemblage 83, the expansion caused thereby in the pipe lines leading to it, and the expansion of the cylinder itself is adequate to cushion the shock.

Also mounted on the body 125 is a switch $LS_4A$, having a rocking operating lever 129. The switch lever 129 is engaged by the bumper plate 124 and, when so engaged, operates the switch to effect a sequence of operation of the machine as is later described herein.

Normally the stop 12 is in the lowered position illustrated in FIG. 18 during the operation of the machine, and in this position stops the feed chuck 10 in retracted starting position. However, when the remnant of the pipe is of less length than the selected length of the coupling blank to be cut off from the pipe, it is desirable, as mentioned, that the feed chuck 10 be retracted beyond its retracted starting position for disposing of the remnant. For this purpose, the stop 12 must be operated to move the bumper 123 out of the way of the path of the plate 124 on the chuck 10.

To operate the stop 12, a piston and cylinder assemblage 130, including a cylinder 131 with a piston 132 reciprocable therein and having a rod 133, is provided. The piston rod 133 is pivotally connected by a pivot 134 to an adjusting screw member 135 which is threaded into the body 125 for effecting axial adjustment of the body 125 along the platform 122 endwise of the path of the pipe. A lock bolt 136, operable in a slot in the platform 122, is provided for clamping the body 125 in adjusted positions. The cylinder 131, in turn, is pivotally connected at the head end to a suitable member 137 on the bracket 120. Thus, when the pressure fluid is admitted to the rod end of the cylinder, the platform 122 is rocked upwardly, carrying the bumper 123 out of the path of the plate 124 on the chuck 10. When the pressure fluid is admitted to the head end of the cylinder 131, the platform 122 is restored to its original operating position wherein the bumper 123 is in the path of the plate 124 on the chuck 10. It is to be noted that the rock shaft 121 is rockable with the platform 122. At its outer end, the rock shaft 121 carries a rocker 138 having arms 138a and 138b. These arms operate a lever 139 of a limit switch $LS_7$ for effecting control operations later described herein.

*Floating coupling chuck*

Referring next to FIGS. 5, 6, 20, 21 and 22, it is desirable, as mentioned, that the pipe be held firmly adjacent the plane of the path of the cutting tools 36 at the side opposite the plane during the cutting operation. It is held at one side of the plane by the jaws 90 of the feeding chuck 10. For holding the pipe at the opposite side of the floating chuck 20 is provided. The chuck 20 includes a pair of jaws 141. Each jaw 141 is carried on a floating carrier 142 mounted on the right hand end of the stationary tubular body 30 of the rotary head assemblage 2. For supporting the carriers 142 for floating movement, slide rods 143 are mounted in bores in the tubular body 30 and extend entirely through the tubular body 30 and protrude therebeyond at the end opposite from the carriers. Each carrier 142 is provided with openings 144 extending therethrough and elongated generally chordally of the tubular body 30. The openings are enlarged at their outer ends as indicated at 144a. The rods 143 extend through the elongated openings 144. At their outermost ends the rods are provided with enlarged heads 145, respectively, which are accommodated in the enlarged portions 144a of the openings 144 with adequate radial clearance for floating movement in a plane normal to the axis of the body 30. The rods 143 are of smaller diameter than the width of the elongated openings 144 so that they have requisite universal floating movement in a plane normal to the axis. Consequently each carrier 142 can float parallel to such planes. Each of the rods 143 is slidable endwise so that it can be drawn to the left in FIG. 21, thus seating the heads 145 tightly against the outer faces of the carriers 142, respectively. Thus, when the jaws 141 engage the pipe with the carriers 142 free and floating, carriers 142 are floated by the jaws to the proper position, depending upon the position of the pipe at the portion engaged. When in this position, the heads 145 clamp the carriers 142 firmly in place and so anchor them and the gripped pipe in fixed radial and axial position.

For operating the rods 143 in this manner, each rod is connected to a reversible piston and cylinder assemblage 146, including a cylinder 147 and a piston 148. In the form illustrated, each rod 143 is the rod of the associated piston 148.

In order to remove the floating carriers 142 to cause the jaws 141 to adapt themselves to the pipe therebetween and grip the pipe, the carriers 142 are connected intermediate their ends by pivots 150 to cranks 151, respectively. The cranks, in turn, are connected to rock shafts 152, respectively. The shafts 152 are rockably mounted in bores extending through the body 30 endwise thereof from the end adjacent the jaws 141 to the opposite end. At the ends of the body 30 opposite from the jaws 141, the shafts 152 are provided with crank arms 153, respectively, which are operated by reversible hydraulic piston and cylinder assemblages 154. Each assemblage has a piston rod 155 connected to the outer end of the associated crank arm 153 and operated by a piston 156 reciprocable in a cylinder 157. The cylinder 157 is pivotally connected by a pivot 158 to a rigid frame portion of the machine.

Assuming a pipe is between the jaws 141 but is unengaged thereby, the piston and cylinder assemblages 154 are operated to move the jaws 141 inwardly. Since the jaws can float both transversely and vertically in a plane normal to the axis of the body 30, the gripping faces of the jaws strike the pipe and adjust themselves to the pipe. When the jaws have adjusted themselves to the pipe by floating movement and have firmly gripped the pipe in the floated position dictated by the pipe by operation of the piston and cylinder assemblages 154, the piston and cylinder assemblages 146 are operated to draw the rods 143 to the left in FIG. 21, thus seating the heads 145 against the outer faces of the carriers 142 and locking the carriers 142 firmly in the floated position, radially and axially. As a result of this operation, any slight deviations from straightness in the pipe, or differences in diameter or out of roundness of the pipe at the point engaged by the jaws 141 of the floating chuck 20, as compared to that engaged by the jaws 90 of the feed chuck 10 is compensated for and the pipe is held firmly close to, and at both sides of, the radial plane of the path of the cutting tools during the cut off position.

*Pipe restrainer*

As mentioned, it is highly desirable, during the retraction of the feed chuck 10, after it is released from the pipe, that the pipe be held firmly to prevent it from being dragged back by the chuck 10 due to residual frictional engagement of the jaws 90 thereof with the pipe, and also from shifting laterally and from twisting due to relief of stresses which might have been imposed during cutting. For accuracy, the pipe should be so held until the feed chuck 10 has returned to its starting position and and has again gripped the pipe at a new location preparatory to the next successive feed advance. For this purpose, the pipe restraining device, indicated at 17 in FIGS. 1 and 11, is provided.

Referring to FIGS. 1 and 11, the pipe restrainer is mounted on a suitable bracket 160 on the frame of the machine and centered over the axis of the pipe is a vertical sleeve 161 in which is a vertically reciprocable hold down rod 162. The rod 162 is arranged so that upon lifting and lowering it can pass between the two jaws 90 of this feed chuck 10 when the feed chuck 10 is in its fully advanced or cutting position. Mounted on the bracket 160 is a reversible piston and cylinder assemblage 163 including a piston 164, the piston rod of which is elongated and provides the hold down rod 162.

The pipe rest 18, as mentioned heretofore, is mounted beneath the jaws 90 with its forward end near to the plane of the path of the cutter tools 36 and forward faces of the jaws 90. The pipe rest 18 is arranged so that, when a piece of pipe is being cut, it rests on the rest 18 and is held fixedly by the jaws 90, and is thereby supported in coaxial relation to the axis of rotation of the rotary head assemblage 2.

Before releasing the jaws 90, the piston and cylinder assemblage 163 is operated to force the rod 162 downwardly so that its lower end bears against the upper surface of the pipe and holds the pipe tightly in contact with the rest 18. While the pipe is so held, the jaws 90 are released and the feed chuck 10 is retracted. Since the pipe is held firmly against the rest 18 by the rod 162, the pipe does not rotate or twist out of position, and is not dragged back by the jaws 90, should there by any frictional engagement with the pipe due to a slight delay in their opening. Thus the pipe restrainer 17 assures that the pipe is held fixedly so that when the feeding chuck 10 is moved back against the stop 12 for stopping it at the proper position for the next succeeding blank, the length of the next succeeding blank will be precisely that intended and essentially the same length as all preceding blanks cut with the particular adjusted setting of the bumper plate 123 of the stop 12.

Discharge trough

Referring next to FIGS. 1, 2, 23 and 24, extending through the rotary head assemblage 2 is a trough 170 which is adjustable vertically so that its receiving end, adjacent the plane of the jaws 141, can be properly positioned to receive cut off blanks as released by the jaws. The trough 170 is adjusted so that the cut off blanks can pass into the trough without any substantial drop as they leave the jaws 141 when they are released by the jaws.

For this purpose, the trough 170 is mounted on a pedestal 171. The pedestal is mounted in guides 172 on the frame of the machine for vertical movement to different adjusted positions. In order to adjust the vertical height of the trough 170, a pair of bell cranks 173 are pivotally mounted between their ends on the frame of the machine. One arm 173a of each crank is pivotally connected to the pedestal 171 and the other arm 173b of each crank is pivotally connected to a transverse sleeve 175. The sleeve 175 carries a threaded adjusting screw 176. The screw 176 has an eyelet 177 which is pivotally connected by a pivot 178 to an extension of the upper guide 172. The screw is adjusted axially to lift and lower the trough 170 to the proper elevation and then is locked firmly in place by lock nuts 179.

The trough 170 discharges into the discharge chute 21.

Remnant detector and disposal

Sometimes the pipes used for cutting off blanks vary in length. Again, even with pipes of equal length, the length of blanks desired may be such that they are not even multiples of the total pipe length. In either case, upon successive blanks being cut off, a pipe remnant will be left at the trailing end of the pipe which is not of sufficient length to provide a coupling.

Heretofore, in such machines, it was necessary for continuous production that the operator watch the pipe, and as its trailing end approached the cutting head, measure the length remaining, compute or determine from a table the number of full length couplings remaining, and time himself so that he would be present and remove the remnant when the last full length of blank was severed. However, with the present mechanism, the remnant is automatically disposed of and the operator need not watch the pipe. Furthermore, upon the remnant disposal, the conventional pipe transfer rack can be operated automatically for delivering another length pipe to its live rolls for feeding it into the machine for starting of another cycle immediately after disposal of the remnant.

To this end a remnant detector 180 is provided, as best illustrated in FIGS. 11, 25 and 26.

The remnant detector 180 is mounted within the body 81 of the feed chuck 10 and comprises, in general, a plate 181 which is mounted on the rock shaft 89 of one of the jaws 90 at the end of the shaft adjacent the associated link 92 for rocking relative to the shaft 89. The plate 181 has a slot 181a spaced from and extending circumferentially of the shaft 89 in which a pin 183 is mounted by one end for adjustment circumferentially of the shaft 89. The other end of the pin 183 is connected to the pivot which connects the associated rocker arm 92 and its link 93. Consequently, upon swinging of the jaws 90 toward closed position, the plate 181 is swung clockwise in FIG. 26. The adjustment is for accommodating the device to pipes of different diameter.

Mounted on a pivot 184 on the lower end of the plate 181, for rocking about the pivot 184, is a rocker arm 185 having a lower end 185a and an upper end 185b. The lower end 185a carries a detector finger 186 having a pipe surface engaging end 186a. The detector finger 186 may be adjusted endwise of the axis of the pipe for detecting the sufficiency of pipe remaining for selected lengths of couplings to be cut. The rocker arm 185 is biased by a spring 187, which is connected to the upper arm 185b of the rocker, against a stop pin 188. When the upper arm 185b is against the pin 188, the end 186a of the detector finger 186 is in a position inwardly from the outer surface of the pipe P. The end 186a normally rides on the pipe surface and hence holds the rocker 185 in rocked position away from the pin 180 against the biasing force of the spring 187. In this rocked position, the upper arm 185b is spaced, in a counterclockwise direction about the rock shaft 89, from the pin 188. The end 186a of the detector finger 186 is positioned endwise of the pipe at a position such that the distance from the leading end of the remainder of a pipe from which a blank has been cut off to the end 186a of the detector finger 186 is equal to the length of a blank to be cut. Consequently, when the pipe remnant is of less length than a blank, and the trailing end of the remnant moves, in a direction toward the head assemblage 2, to a position beyond the end 186a of the detector finger 186, the end 186a is freed by the pipe so that it can swing inwardly. Thereupon the spring 187 rotates the plate 181 clockwise.

The upper arm 18b of the rocker 185 carries a wear plate 189 which normally is in contact with a lever 190 of a normally open limit switch $LS_6$. When the end 186a is resting against the pipe, the rock shaft 185 is held in a position rocked counterclockwise from that shown in FIG. 26 and is holding the switch lever 190 in the dotted position indicated in FIG. 26, wherein the limit switch $LS_6$ is closed.

The switch $LS_6$ is self-restoring, and when the lever 190 is released by the plate 189, the switch returns automatically to the open position illustrated in full lines in FIG. 26.

Thus the end 186a of the detector finger 186 rides on the pipe as the feeding chuck 10 is moved toward retracted position. If there is enough length of pipe remaining for forming a coupling, the detector finger 186 holds the switch lever 190 in the dotted line closed position in FIG. 26, in which case the switch is on. On the other hand, if there is not enough pipe left for a blank, the end 186a is moved inwardly beyond the normal circumferential wall of the pipe P to the position shown in solid lines in FIG. 26 by the spring 187. This removes the plate 189 of the rocker arm 185b from the switch lever 190 whereupon the switch level swings to the right and closes the switch.

As hereinbefore described, the jaws 90 of the feed chuck 10 normally release the pipe prior to retraction of the chuck 10 and while the pipe is being held by the pipe restraining device 17. The limit switch $LS_6$ is connected in a circuit such that while the switch is open, it prevents release of the clamping jaws 90 of the feed chuck 10. Consequently, when the feed chuck 10 is subsequently returned toward retracted position, the jaws continue to hold the remnant and carry it toward retracted position of the chuck, instead of being released in the forward position of the chuck. Likewise, when this condition exists, it causes operation of the stop 12 so that the bumper plate 123 thereof is moved out of its normal position in the path of the retracting chuck 10. Hence the chuck 10 returns, to the right in FIG. 2, beyond its normal starting retracted position to a more retracted remnant disposal position, carrying with it the remnant of the pipe. When the chuck 10 reaches this remnant disposal position, it operates a limit switch, later to be described, which causes the chuck jaws 90 to open and drop the remnant.

At this more retracted position, a remnant receiving chute 191 is arranged to receive the freed remnant and discharge it into a suitable hopper.

General operation

Referring briefly, therefore, to the machine and the order in which it performs the various steps, whether by hand, or automatically as will later be described, the pipe P is fed from the transfer mechanism live rolls 8 onto the idler roll 9 and then along the rest 18. At the time of starting of the machine, the feed chuck 10 is in the remnant disposal position with its jaws 90 open and the facing stop 11 is operative so that its contact plate 104 is disposed in the path of the oncoming leading end of the pipe. The leading end of the pipe reaches the facing stop 11 and strikes the plate 104 and is stopped in a position such that upon advance of the feed chuck 10, the pipe will be moved toward the rotary cutting head assemblage 2 only a sufficient amount to cause the cutting tools 36 to face the leading end of the pipe.

The plate 104, which is insulated from its arm 103, completes an electric circuit through the pipe when the pipe end is engaged therewith. This electric circuit energizes mechanism for closing the jaws 90 of the feed chuck 10 and also completes the circuit for causing the assemblage 106 to lift the arm 103, thus removing the facing stop, arm 103 and plate 104 from the path of the chuck 10 and stock.

Upon closure of the jaws 90, the check 10 is caused to advance to its normal advanced or cutting position and this full advance of the chuck 10 brings the leading end of the pipe into position for the facing cut.

The facing cut having been completed, the pipe restrainer 17, which has been operated to hold the pipe firmly down against the rest 18, continues to so hold the pipe. The jaws 90 of the feed chuck 10 release the pipe and the chuck 10 is retracted. This retraction continues until the bumper plate 124 on the chuck strikes the bumper plate 123 of the stop mechanism 12 and the chuck 10 is stopped in the retracted starting position which is such that upon the next advance of the chuck 10 to its fully advanced position, after it has regripped the pipe, the chuck feeds the length of pipe to a position so that exactly the length required for a coupling will be cut off. When the chuck 10 is in retracted starting position, the jaws 90 are closed and thereupon the pipe restrainer 17 is retracted to inoperative position. The chuck 10 then advances to its advanced cutting position wherein the forward leading face of the chuck jaws 90 are substantially at the path of the cutters and the proper length of pipe to form a blank has passed beyond the cutter path and floating jaws 141 into the tubular body 30. In such position, the floating chuck 20 is operated to grip the pipe at a location just beyond the cutter path in the feeding direction, thus holding the pipe firmly, closely adjacent the path both in advance and to the rear of the path. Thereupon the piston and cylinder assemblage 74 is operated to cause the cutting tools 36 to advance and cut off the blank and then retract.

At the end of the cutting operation, the cutting tools are fully retracted. The pipe restrainer 17 remains operative to hold the pipe tightly against the rest 18 before the jaws 90 release. While the pipe is thus held by the pipe restrainer 17, the chuck retracts with its jaws open, to retracted starting position, ready to repeat the cycle. Meanwhile, the jaws 141 of the clamped floating chuck 20 remain operative to hold the severed coupling blank. They continue to hold the blank until the newly formed leading end of the remainder of the pipe moves into position and almost strikes the adjacent trailing end of the severed blank. Thereupon, the floating chuck jaws 141 release. The leading end of the pipe remainder, being at this time advanced beyond the cutting tools 36 in the feeding direction, the already severed coupling blank cannot vibrate and be accidentally moved into the path of the cutters. Instead it is pushed on through the tubular body 30 by the pipe along the trough 170 until eventually it falls off the end of the trough 170 into a coupling receiving chute 21.

As the final remnant of the pipe P passes beyond the end 186a of the detector finger 186, of the sensing mechanism 180, the detector finger 186 swings inwardly of the pipe, whereupon the jaws 90 of the chuck 10 remain closed on the pipe during the retraction of the chuck and thus carries the remnant rearwardly. The coupling length stop 12 is retracted from the path of the chuck 10 so that the chuck moves in the retracting direction beyond its normal starting position to the disposal position and when in that position the jaws 90 are released and the remnant discharged.

In order to cause automatic operation of the machine, a number of operations are controlled by a cam bar 193 driven by the portion 80 of the yoke 68 which advances and retracts the tool carriages. As illustrated in FIG. 27 the cam bar 193 is connected to the lower end of the arm portion 80 and is driven endwise thereby. The bar 193 is slidably supported in guides 194 on the frame of the machine and carries adjustable limit switch trips 195 and 196 for tripping limit switches $LS_2B$ and $LS_4B$, respectively.

Hydraulic system

Figure 28:
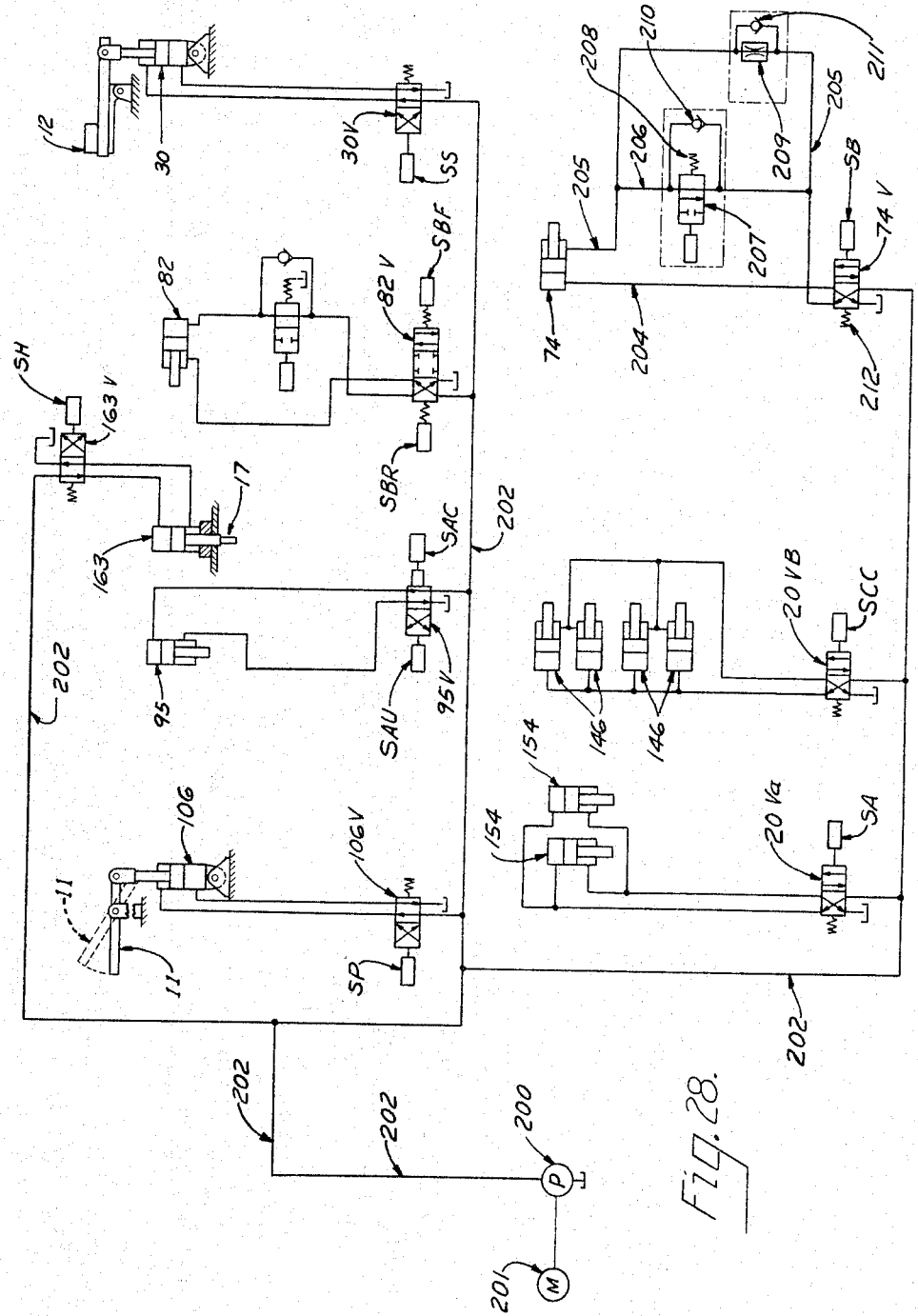
FIG. 28 is a schematic showing of a preferred hydraulic circuit of the machine.

Referring next to FIG. 28, hydraulic fluid is supplied by a pump 200 driven by an electric motor 201, the delivery side of the pump being connected to the pressure side of a circuit comprising interconnected pipe lines 202.

The feed chuck 10 is advanced and retracted, as mentioned, by a piston and cylinder assemblage 82. The assemblage 82 is controlled by a cutoff and reversing valve $82_V$ operated by solenoids SBR and SBF. The valve $82_V$ is spring returned to cutoff position. The solenoid SBR, when energized, sets the valve $82_V$ to retract the chuck 10. The solenoid SBF, when energized, sets the valve $82_V$ to advance the chuck 10.

The jaws 90 of the feed chuck 10 are opened and closed by the piston and cylinder assemblage 95 which is controlled by a solenoid valve $95_V$ operated by solenoids SAO and SAC. When the solenoid SAO is energized and the solenoid SAC is deenergized, the solenoid SAO sets the valve $95_V$ to open the jaws 90 of the chuck 10. When the solenoid SAC is energized and the solenoid SAO is deenergized, the solenoid SAC sets the valve $95_V$ to close the jaws 90 of the chuck 10.

The facing stop 11 is operated by the piston and cylinder assemblage 106 which is controlled by a spring returned solenoid valve $106_V$. The valve is operated by a solenoid SP which, when energized, causes the valve to operate the assemblage 106 to move the facing stop 11 to operative position. Upon return, of the valve $106_V$, it causes the assemblage 106 to move the facing stop 11 out of the path of the pipe and chuck 10.

The piston and cylinder assemblage 30 of the coupling length stop 12 is controlled by a spring returned solenoid valve $30_V$. The valve $30_V$ is operated by a solenoid SS which, when energized, sets the valve $30_V$ to cause the assemblage 30 to lower the stop 12 into operating position wherein it limits the retraction of the chuck 10 to retracted starting position. When returned by the spring, the valve $30_V$ causes the assemblage 30 to retract the stop 12 for permitting the chuck 10 to move to the more retracted remnant disposal position.

The assemblage 163 of the pipe retaining device 17 is controlled by a spring returned solenoid valve $163_V$. The valve $163_V$ is controlled by a solenoid SH which, when energized, sets the valve to cause the assemblage 163 to render the pipe restrainer 17 inoperative. Upon deenergization of the solenoid SH, the spring returns the valve $163_V$ to cause the assemblage 163 to render the pipe restrainer 17 operative to clamp and hold the pipe.

The coupling floating chuck 20 is controlled by two spring return solenoid valves 20VA and 20VB. The valve 20VA is operable to operate the assemblages 154 to control the opening and closing of the chuck 20. The valve 20VB is operable to control the assemblages 146 for clamping of the jaws against floating and for releasing them.

The valve 20VA is controlled by a solenoid SA which, when energized, causes the assemblages 154 to close the jaws. When the valve is returned by its spring, it causes the assemblages 154 to open the jaws.

The valve 20VB is controlled by a solenoid SCC which, when energized, sets the valve 20VB to cause the assemblages 146 to clamp the jaws of the chuck 20 to prevent their floating. Upon return of the valve 20VB when the solenoid is deenergized, it sets the valve to cause the assemblages 146 to clamp the jaws against floating.

In order to advance and retract the tools, the hydraulic piston and cylinder assemblage 74 is connected to a spring return reversing valve $74_V$ operated by a solenoid SB which, when energized, sets the valve $74_V$ to cause the assemblage 74 to advance the tools 36 on the cutting stroke. Normally this advance is rapid. When the solenoid SB is deenergized, the return spring sets the valve $74_V$ to cause the assemblage 74 to retract the tools.

In order that the initial advance of the tools toward the pipe be rapid, followed by a slower and fine feed advance during cutting, one port of the valve $74_V$ is connected to the head end of the assemblage 74 by a line 204 and another port is connected to the rod end of the assemblage by a line 205.

This porting of the valve $74_V$ is such that when the solenoid SB is energized, it sets the valve to supply pressure fluid to the head end of the assemblage 74 through the line 204 and permit return of fluid from the rod end of the assemblage 74 through the line 205. Upon deenergization of the solenoid, the return spring sets the valve to reverse this connection, so that the assemblage 74 retracts the tools. The advance of the tools in this manner normally is rapid. To provide for rapid initial advance followed by fine feed as the tools engage the work, a by-pass line 206 is provided. A by-pass valve 207 is interposed in the line 206 between the rod end of the assemblage 74 and valve $74_V$. This valve is normally set by a spring 208 in a position to permit free return flow of fluid through the by-pass line 206 to the return port of the valve $74_V$ as the tools are rapidly advanced. When the cutting stroke is initiated, the valve 207 is operated to close the by-pass line 206. Upon closure of the valve 207, the pressure fluid returning from the rod end of the assemblage 74 is thereby caused to flow through the line 205. Connected in the line 205 between the rod end of the assemblage 74 and the valve $74_V$ is a flow control throttle 209 which, by limiting the rate of discharge of fluid from the rod end of the assemblage 74, reduces the rate of advance in accordance with the setting of the throttle 209.

Checks valves 210 and 211, opening toward the rod end of the assemblage 74, are arranged in by-passing relation around the valve 207 and throttle 209, respectively, to permit a free flow of fluid to the rod end at all times when the solenoid SB is deenergized and the valve $74_V$ is set in position by its spring 212.

In order to set the valve 207 to off position at the end of the rapid advance of the tools, a trip finger 313 is provided and is arranged to be engaged by the adjustable cam 214 on the cam bar 193 which is operated by the arm 80 on the yoke which advances and retracts the tools, as shown in FIG. 27.

Further, for automatically controlling the machine, limit switches, as follows, are located for operation by various parts of the machine:

Limit switch $LS_1$ is a maintained contact limit switch and is operated by the jaws 90 of the feed chuck 10 so as to close when the feed chuck jaws close and to open when the feed chuck jaws open.

$LS_1A$ is a spring return normally open limit switch arranged relative to the floating chuck 20 so as to be held closed when one of the jaws 141 of the floating chuck 20 close.

$LS_1B$ is a spring return normally open limit switch arranged relative to the floating chuck 20 so as to be held closed when the other of the jaws 141 of the chuck 20 close.

$LS_2A$ is a spring return normally open limit switch positioned to be closed when the feed chuck 10 reaches its forward or fully advanced position.

$LS_2B$ is a like spring return normally open limit switch positioned to be closed by the trip 195 on the cam bar 193 when the tools complete their feed stroke.

$LS_3$ is a maintained contact limit switch operated by the facing stop 11 so as to close one circuit and open another when the facing stop is retracted to inoperative position and to open the one circuit and close the other when the stop reaches horizontal operating position.

A limit switch $LS_4A$ is a spring return normally open limit switch positioned adjacent the bumper plate 123 of the coupling length stop 12 and is closed by the bumper plate 124 of the chuck 10 when the stop is in a horizontal position and stops the chuck 10. $LS_4A$ remains closed when the chuck 10 is in retracted starting position.

Limit switch $LS_4B$ is a spring return normally open limit switch operated by the trip 196 on the cam bar 193 and closed thereby when the cut off tools reach their fully retracted position.

$LS_4C$ is a spring return normally open limit switch arranged to be closed, and held closed, when the coupling length stop 12 is in inoperative position. $LS_4C$ remains closed as the feed chuck 10 reaches its more retracted remnant disposal position.

$LS_6$ is a spring return normally open limit switch arranged to be held closed when the detector 186, for detecting whether the length of pipe remaining is long enough for a coupling, is in contact with the pipe when the feed chuck 10 is closed. The $LS_6$ is released by the detector 186 and opens if insufficient stock remains for a coupling.

$LS_7$ is a normally open maintained contact limit switch arranged to be closed when the coupling length stop 12 is raised to inoperative position, thereby closing one circuit and opening another, and to reverse the opening and closing of both circuits when the stop 12 is lowered to operative position.

$LS_8$ is a limit switch which is closed when engaged by the leading end of the pipe when the stop 11 is in operating position.

If desired, a spring return normally open limit switch can be provided and arranged to be held closed by a pipe on the transfer rack skid which feeds pipe onto a transfer rack. Also a spring return normally open limit switch may be provided on the conveyor of the transfer table and held closed by the pipe until the trailing end is clear of the live rolls 8 of the charging conveyor. These are employed only if it is desired to connect the machine to a transfer rack for automatic introduction of successive lengths of stock into the machine from the rack.

*Automatic sequence of operation*

Figure 29:
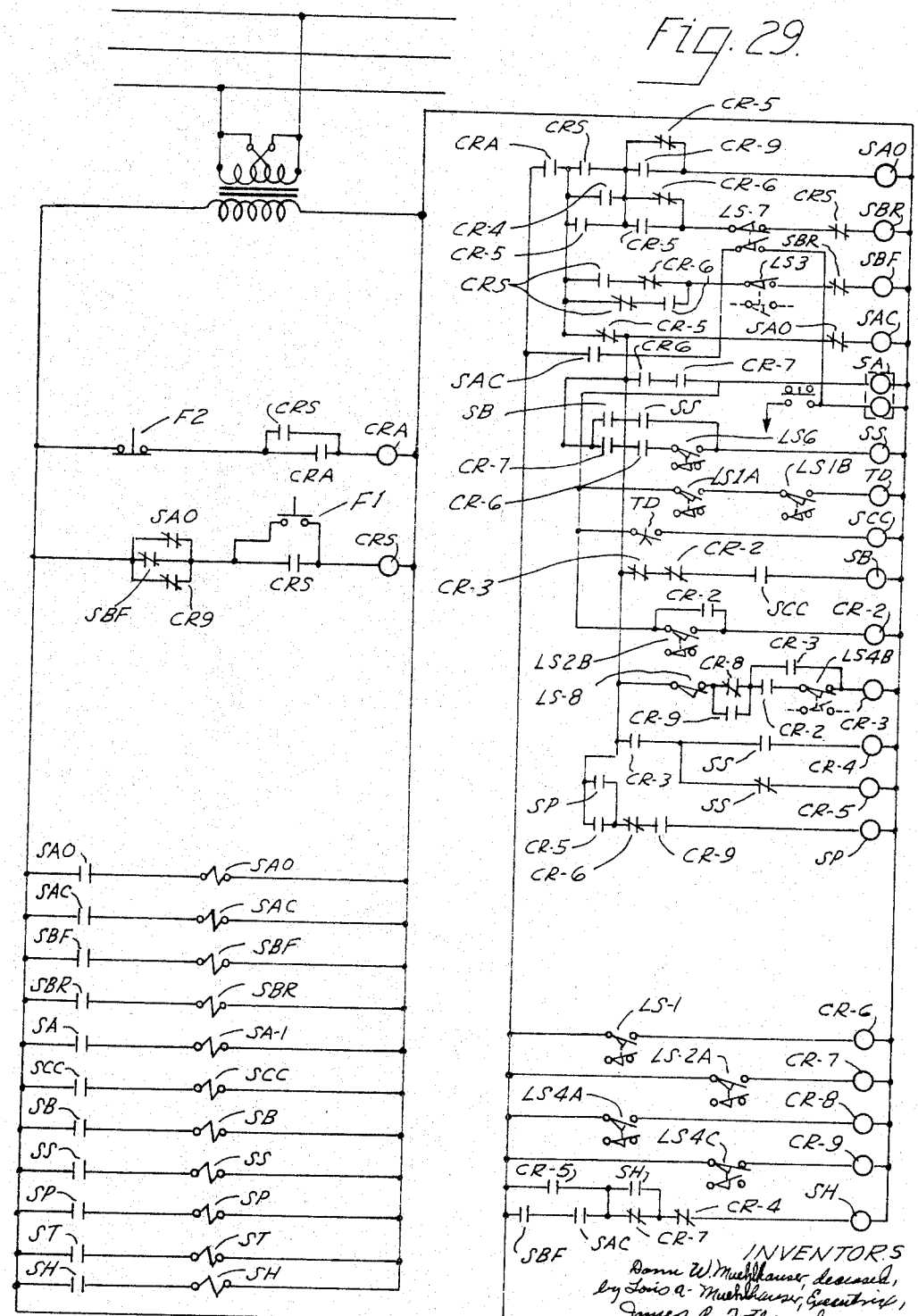
FIG. 29 is a wiring diagram illustrating the basic electrical control of the cycle of operation of the machine.

In the wiring diagram, FIG. 29, it is to be noted that each of the solenoids is operated by closing of normally open relay contacts. Each solenoid is shown by a coil designation in series across ahe control power lines with open relay contacts with the same designation as the associated solenoids. Instead of operating the relay contacts for the solenoids directly they are operated by relay coils shown in the diagram as circles and bearing the same designation as the associated solenoid in each instance.

In describing the sequence of operation of the machine, the operation of the relays will be described, these relays being such that, when energized, they close the normally open switches to the like designated solenoids, thereby energizing the solenoids.

The sequence assumes that the hydraulic pump, motor, and spindle drive motor are running. The machine is started by closure of switches $F_1$ and $F_2$, shown in FIG. 29.

When the machine is started, the first cycle is a so-called dummy cut wherein the cycle is run without any pipe being in the machine. In this first cycle the feed chuck 10 moves forwardly with its jaws 90 open. At the end of its forward stroke, the jaws 90 of the chuck 10 close and the cutting tools 36 advance. The object of the dummy cut is to provide the relay panel with the necessary setting for the next cycle, as set out in Steps 1 through 10 below. After the dummy cut, if there happens to be sufficient pipe in the machine, as indicated by the detector 186, the next cut forms a coupling blank. The coupling length stop 12 will drop and the chuck 10 will retract against the stop 12 with its jaws 90 open and then close and advance the pipe forward the preset amount determined by the stop 12, as in Steps 11 through 19 below.

On the other hand, if the remnant detector 186 indicates insufficient pipe for a coupling, the chuck 10 returns with its jaws 90 closed to the more retracted position and moves the remnant to disposal position. Thereupon the jaws 90 open, facing stop 11 drops into operative position for engaging the end of the oncoming pipe as it is moved into the machine by the live charging rolls 8 of the transfer rack conveyor, as set forth in Steps 20 through 32 below.

The sequence is as follows:

(1) When the switch $F_1$ is closed, control relay CRS is energized. Since $F_2$ is normally closed, control relay CRA is energized. Hence closure of $F_1$ causes energization of solenoid relay SAO through the now closed contacts of CRS.

(2) The jaws 90 of the feed chuck 10 open, limit switch $LS_1$ is tripped down. A control relay $CR_6$ is deenergized, and a solenoid relay SBF is energized.

*Note.*—The terms "tripped up" and "tripped down" apply only to limit switch operations as shown on the schematic diagram and are not intended to describe the actual operation of the switches on the machine.

(3) The feed chuck 10 moves forwardly, the limit switch $LS_4C$ is tripped down, and a control relay $CR_9$ is deenergized.

At the end of the forward stroke, the limit switch $LS_2A$ is tripped up, a control relay $CR_7$ is energized, the control relay CRS and the solenoid relay SAO are deenergized. The solenoid relay SAC is energized. The jaws 90 of the feed chuck 10 close. The limit switch $LS_1$ is tripped up and control relay $CR_6$ and "pick-up" coil of a latching relay SA are energized.

(4) If there is sufficient pipe in the machine for the next coupling cut, the stock detector 186 trips limit switch $LS_6$ up and solenoid relay SS is energized. The coupling length stop 12 is lowered to horizontal position, limit switch $LS_7$ is tripped down, and the "drop-out" coil DO of the latching relay SA is energized. However, since the "pick-up" coil PU of the latching relay SA is also energized, there is no change in the condition of relay contacts of the latching relay.

(5) If the pick-up coil PU of the latching relay SA is energized, as mentioned in Step 4 above, there would normally be no change in the position of the jaws 141 of the coupling chuck 20. The jaws would remain normally closed.

(6) When the coupling chuck jaws 141 are closed and the limit switches $LS_1A$ and $LS_1B$ are tripped up a pneumatic timing relay TD is energized. On delay, timing relay TD provides time for the coupling chuck jaws 141 to grip before the clamp cylinder assemblage 146 causes engagement of the clamps 145.

(7) The timing relay TD times out when solenoid relay SCC is energized. The coupling chuck clamp cylinder assemblages 146 operate and cause the clamps 145 to engage with the jaws 141. The solenoid relay SB is energized through closing of the contacts of solenoid relay SCC.

(8) The tool operating piston cylinder assemblage 74 extends and advances the cut off tools through the rapid advance and feed strokes. Limit switch $LS_4B$ is tripped down. At the end of the feed stroke the limit switch $LS_2B$ is tripped up. The control relay $CR_2$ is energized, the solenoid relay SB is deenergized.

(9) The feed cylinder assemblage 74 retracts the cutting tools 36 by a rapid return stroke. Limit switch $LS_2B$ is tripped down. At the end of the return stroke, limit switch $LS_4B$ is tripped up. The control relays $CR_3$ and $CR_4$ and the solenoid relay SAO are energized. The solenoid relay SAC is deenergized. The drop out coil of latch relay SA also is deenergized.

(10) The feed chuck jaws 90 open. The limit switch $LS_1$ is tripped down. Control relays $CR_6$ and $CR_2$ are deenergized. The solenoid relay SBR is energized. The solenoid relay SBF, the pick-up coil PU of the latching relay SA, timing relay TD, and the solenoid relay SCC are deenergized. Clamp cylinder assemblages of the coupling chuck 20 thereupon release.

(11) The feed chuck 10 returns to retracted position. The limit switch $LS_2A$ is tripped down. The control relay $CR_7$ is deenergized. When the feed chuck 10 contacts the bumper of the coupling length stop 12, the limit switch $LS_4A$ is tripped up and control relay $CR_8$ is energized. Control relay $CR_3$, the control relay $CR_4$, the solenoid relay SAO and the solenoid relay SBR are deenergized. The solenoid relay SAC and the drop-out coil of the latching relay SA are energized.

(12) The jaws 90 of the feed chuck 10 close. Limit switch $LS_1$ is tripped up. If sufficient stock is available for the next cut, the limit switch $LS_6$ is tripped up. The jaws 141 of the coupling chuck 20 open. Limit switch $LS_1A$ and the limit switch $LS_1B$ are tripped down. Control relay $CR_6$, solenoid relay SBF, and the solenoid relay SH are energized.

(13) The hold down cylinder assemblage 163 retracts the pipe restrainer 17 to inoperative position. The stock feed chuck 10 moves forwardly with the pipe. Limit switch $LS_4A$ is tripped down. The control relay $CR_8$ is deenergized. At the end of the forward stroke of the feed chuck 10, the limit switch $LS_2A$ is tripped up, the control relay $CR_7$ and the "pick-up" coil PU of the latch relay SA is energized.

(14) The jaws 141 of the coupling chuck 20 close. The limit switches $LS_1A$ and $LS_1B$ are tripped up. On delay, pneumatic timing relay TD is energized. When the timing relay TD times out, the solenoid relay SCC is energized. Clamping cylinder assemblages 146 of the coupling chuck 20 cause engagement of the clamps 145 with the jaws 141. Solenoid relay SB is energized through closing of the contacts of the solenoid relay SCC.

(15) The feed cylinder assemblage 74 extends and the cut off tools 36 advance through a rapid advance and feed stroke, making a parting cut on the pipe. Limit switch $LS_4B$ is tripped down. At the end of the feed stroke the limit switch $LS_2B$ is tripped up, control relay $CR_2$ is energized, and solenoid relay SB is deenergized.

(16) During the feed stroke, while the solenoid relay SB is energized, the detector 186 is sensing the length of the pipe remaining. If there is sufficient stock for another coupling, the limit switch $LS_6$ is tripped up and the solenoid relay SS remains energized and the cut off length stop 12 remains in horizontal position. Limit switch $LS_7$ remains unchanged.

(17) The feed cylinder assemblage 74 retracts the tools through the rapid return stroke. Limit switch $LS_2B$ is tripped down. At the end of the return stroke, the limit switch $LS_4B$ is tripped up. Control relays $CR_3$ and $CR_4$ and the solenoid relay SAO are energized. The control relay $CR_2$, the solenoid relay SAC and SH are deenergized. The drop out coil of latch relay SA also is deenergized.

(18) The stock hold down assemblage 163 of the pipe restrainer 17 extends, holding the stock firmly against the rest 18 therebeneath. The jaws 90 of the feed chuck 10 open. Limit switch $LS_1$ is tripped down. The control relay $CR_6$ is deenergized, the solenoid relay SBR is energized, the solenoid relay SBF, the pick-up coil of the latching relay SA, the timing relay TD, and the solenoid relay SCC are deenergized. The clamping piston cylinder assemblage 146 of the coupling chuck 20 release the clamps 145.

(19) The cycle as outlined in Steps 8 through 15 continues as long as pipe is available for a full length coupling.

(20) When the end of the pipe is reached, as sensed by the end 186a of the detector finger 186, the cycle repeats the Steps 11 through 15, except that the limit switch $LS_6$ is not tripped when the feed chuck 10 closes, as in Step 12. Then, when the solenoid relay SB is energized, as in Step 16, the holding circuit to the solenoid relay SS is interrupted. When the solenoid SS is deenergized, the coupling length stop 12 is retracted to the vertical position out of the path of the retracting feed chuck 10 and limit switch $LS_7$ is tripped up.

(21) At the end of the feed stroke, the feed cylinder assemblage 74 retracts the cutting tools 36 through the rapid return stroke, as in Step 17, the limit switch $LS_2B$ is tripped down. At the end of the return stroke, the limit switch $LS_4B$ is tripped up. However, instead of the control relays $CR_3$ and $CR_4$ and the solenoid relay SAO being energized, the control relays $CR_3$ and $CR_5$ and the solenoid relay SBR are energized, and the solenoid relay SBF is deenergized.

(22) The feed chuck 10 returns with the remnant end of the pipe to the remnant disposal position. Limit switch $LS_2A$ is tripped down, the control relay $CR_7$ is deenergized, the pick-up coil PU of the latching relay SA, the timing relay TD, the solenoid relay SCC and control relay $CR_2$ are deenergized. The clamps 145 of the coupling chuck 20 are released by their piston and cylinder assemblages 146. When the feed chuck 10 reaches disposal position, the limit switch $LS_4C$ is tripped up, control relay $CR_9$, and the solenoid relay SAO are energized, and solenoid relay SAC is deenergized.

(23) Thereupon the jaws 90 of the feed chuck 10 open, the remnant end drops into the remnant disposal chute, limit switch $LS_1$ is tripped down, control relay $CR_6$ is deenergized, and solenoid relay SP is energized. The facing stop 11 drops into face engaging position and the limit switch $LS_3$ is tripped up.

(24) Next, a length placed on the conveyor rolls of the coupling mechanism by an operator or by the transfer mechanism, is moved forwardly until it contacts the limit switch $LS_8$ on the facing stop 11. The control relays $CR_3$ and $CR_5$ and the solenoid relays SAO, SBR and SH and the relay $S_4$ are deenergized. At this time the feed chuck 10 is in the remnant disposal position. The solenoid relay SAC is energized.

(25) The jaws 90 of the feed chuck 10 close, limit switches $LS_1$ and $LS_6$ are tripped up, control relay $CR_6$ is energized, and solenoid relay SP is deenergized.

(26) The stop 12 is retracted to vertical position, limit switch $LS_3$ is tripped down, and the solenoid relays SBF and SH are energized.

(27) The hold down cylinder assemblage 163 retracts the pipe restrainer 17. The feed chuck 10 moves forwardly with the pipe. The limit switch $LS_4C$ is tripped down. The control relay $CR_9$ is deenergized. At the end of the feed stroke of the feed chuck 10, limit switch $LS_2A$ is tripped up. The control relay $CR_7$, the pick-up coil PU of the latching relay SA, the solenoid relay SS, and the timing relay TD are energized.

(28) Since the latching relay SA was never tripped following the previous cycle, the jaws 141 of the coupling chuck 20 remain closed and limit switches $LS_1A$ and $LS_1B$ remain tripped up. The bumper of the stop 12 is lowered to horizontal operative position. Limit switch $LS_7$ is tripped down. The "drop-out" coil DO of the latching relay SA is energized, but since the pick-up coil PU is also energized, there is no change in the condition of the relay contacts. On delay, timing relay TD times out. Solenoid relays SCC and SB are energized.

(29) The clamping cylinders 146 of the coupling chuck 20 operate and clamp the jaws thereof. The feed cylinder assemblage 74 extends. The cut off tools advance through rapid advance and feed strokes, making a facing cut for facing the end of the leading end of the pipe. The limit switch $LS_4B$ is tripped down. At the end of the feed stroke, the limit switch $LS_2B$ is tripped up, the control relay $CR_2$ is energized, a solenoid relay SB is deenergized.

(30) The feed cylinder 74 retracts the tools 36 through the rapid return stroke. The limit switch $LS_2B$ is tripped down. At the end of the return stroke, the limit switch $LS_4B$ is tripped up. Control relay $CR_3$ and control relay $CR_4$ and the solenoid relay SAO are energized. The control relay $CR_2$, the solenoid relay SAC, and solenoid relay SH are deenergized.

(31) The stock hold down cylinder assemblage 163 extends and causes the pipe restrainer 17 to engage the pipe and hold it firmly against the rest 18. The feed chuck jaws 90 open. The limit switch $LS_1$ is tripped down. The control relay $CR_6$ is deenergized. The solenoid relay SBF is energized. Solenoid relay SBF, the pick-up coil PU of the latching relay SA, the timing delay TD, and the solenoid relay SCC, are deenergized, whereupon the clamping assemblages 146 of the chuck 20 release.

(32) the cycle starting with stop 11 repeats.

(33) For normal stop, the switch $F_2$ is opened and deenergizes control relay CRA. The cycle stops after CRA control relay is deenergized.

As mentioned in this cycle of operation, the solenoid relays operate the solenoid valve with like designation, the relays being shown as circles with the solenoids being shown as coils. For convenience in reference, operations of the various solenoid operated valves, energized and deenergized, is set forth below.

| Valves | Energized | Deenergized |
| --- | --- | --- |
| SAO | Opens jaws 90 of feed chuck 10. | Removes solenoid pressure from the pilot spool of the valve. |
| SAC | Closes the jaws 90 of the feed chuck 10. | Removes solenoid pressure from the pilot spool. |
| SBF | Moves feed chuck 10 forwardly. | Blocks hydraulic pressure and return lines to the advance and retract cylinder assemblage 83 of the feed chuck 10, thus stopping the feed chuck 10 wherever it happens to be. |
| SBR | Returns feed chuck 10 to retracted starting position. | Blocks hydraulic pressure and return lines to the feed chuck advance and retract cylinder assemblage 83; also stops feed chuck 10 wherever it happens to be. |
| SA | Closes jaws 141 of the floating coupling chuck 20. | Opens jaws 141 of the coupling chuck 20. |
| SCC | Operates the clamping cylinder assemblages 146 of the coupling chuck 20 and applies clamps 145 to prevent movement of the stock during cutting. | Operates the clamping cylinder assemblage 146 to release the clamps 145 so that the jaws are free to float and open. |
| SB | Extend the feed cylinder assemblage 74 which advances the cut off tools to the rapid advance and feed strokes. | Retracts the feed cylinder assemblage 74 which returns the cut off tools to retracted position. |

| Valves | Energized | Deenergized |
| --- | --- | --- |
| SS | Lowers the coupling link stop 12 which limits feed chuck carriage return or retraction to that required for proper coupling lengths upon next advance. | Raises the coupling lengths stop 12 to permit feed chuck carriage to retract to disposal position. |
| SP | Lowers the facing pipe stop 11 | Raises the facing pipe stop 11 to retracted position. |
| ST | Raises the kickers on the transfer table until the pipe rolls the loading skid onto the charging conveyor. | Lowers the kickers on the transfer table to receive the next pipe in position for pickup. |
| SH | Retracts assemblage 163 to withdraw pipe restrainer 17 from pipe so that it is free to move forwardly when the feed chuck feeds forwardly. | Extends the assemblage 163 causing the pipe restrainer 17 to clamp pipe so that it remains in position during return of the feed chuck. |

The transfer table used in connection with the machine is a separate invention, as defined in the above identified patent, and with the added switches herein designated obviously could be made to position pipe on the charging conveyor or live rolls 8 after each return of the feed chuck 10 to the remnant disposal position, and thereby start a succeeding pipe through the machine, thus repeating the cycle.

Having thus described our invention, we claim:

1. A cut off machine for cutting off blanks from elongated metal stock and comprising:
   (a) a frame;
   (b) a power driven rotary cutting head carried thereby;
   (c) a cutting tool carriage supported by the head for movement toward and away from the rotary axis of the head on cutting strokes and on return strokes, respectively, and for concurrent movement in an orbital path about the rotary axis;
   (d) power means for moving the tool carriage on said strokes during the orbital movement of the carriage;
   (e) a feed chuck having jaws defining, when closed, a gripping throat, said feed chuck being mounted on the frame for movements toward the head to an advanced cutting position and away from the head to a retracted starting position, while maintaining the throat coaxial with the rotary axis of the head during said movements;
   (f) feed chuck driving power means for advancing and retracting the feed chuck;
   (g) jaw operating power means for opening and closing the jaws of the feed chuck;
   (h) a coupling chuck disposed beyond the orbital path of the carriage in the direction of advance of the feed chuck;
   (i) said coupling chuck including floating jaws which are operable to float to adjusted positions radially of the rotary axis during closure and are arranged to be clamped, after closure, in the selected adjusted positions to which they have floated;
   (j) floating jaw power means for opening and closing said floating jaws;
   (k) clamping power means to clamp the floating jaws in said selected adjusted positions, respectively;
   (l) said jaws of the feed chuck, when the feed chuck is in fully advanced position, being closely adjacent that side of the plane of the orbital path of the tool carriage toward which the feed chuck advances; and
   (m) the floating jaws being closely adjacent said plane at the side opposite from the feed chuck jaws.

2. A cut off machine according to claim 1 wherein a pipe restrainer is disposed closely adjacent to said path, on the same side of said plane at the feed chuck, said restrainer is operable, selectively, to engage the pipe, while the feed chuck is in cutting position and prior to opening of the jaws of the feed chuck, and thereby constrain the pipe from movement while the feed chuck jaws are being released and while the feed chuck is being retracted, and to release the stock for movement, and power means are provided for operating the restrainer to cause said selective engagement with, and release of, the stock.

3. The structure according to claim 1 wherein stop means are provided and are engageable by the feed chuck during retraction of the feed chuck for stopping the feed chuck in a retracted starting position, and fluid pressure shock absorbing means are mounted on the stop and engageable and operable by the retracting feed chuck for cushioning the impact of the feed chuck against the stop.

4. The structure according to claim 1 wherein stop means are provided and are movable into and out of the path of the feed chuck, said stop means, when in said path of the feed chuck, being engageable by the feed chuck, upon retraction of the feed chuck, and operable when engaged for stopping the feed chuck in a retracted starting position, said feed chuck being movable in the retracting direction to a more retracted disposal position when the stop means are out of said path, and power means for moving the stop into and out of the feed chuck path.

5. A cut off machine according to claim 4 wherein a retractable facing stop is provided and has a stock engaging stop portion movable into and out of the path of the stock at a location which is between the head and the retracted position of the feed chuck, said stop portion, when in the stock path, being engageable by the original leading end of the original length of stock, as the stock is initially advanced by the feed chuck, for initially positioning the original stock endwise in a position such that, when the stock is gripped by the feed chuck in the disposal position of the feed chuck and the feed chuck is advanced to cutting position, the original pipe is advanced only enough for an end facing cut, and power means are provided for moving the facing stop into said path while the feed chuck is in a retracted position and for moving the facing stop out of said path before the initiation of the advance of the feed chuck.

6. A cut off machine according to claim 1 wherein the jaws of the floating chuck, at the end of the floating chuck nearest said orbital path, have gripping portions, said gripping portions protrude from the remainder of the chuck in a direction toward said path and are disposed substantially at the side of the plane of said orbital path nearest the floating chuck.

7. A cut off machine according to claim 1 wherein stop means are provided and are operative for normally stopping the retraction of the feed chuck in said retracted starting position and for permitting the feed chuck to move to a more retracted remnant disposal position, selectively, control means are provided for normally causing the jaw operating power means of the feed chuck jaws to open prior to initiation of retraction of the feed chuck from cutting position, a detector is provided and is operative to detect when the remaining length of stock gripped by the feed chuck is of less length than the length to be cut off, means are responsive to the detector, when it detects that the remnant of stock is shorter than that to be cut off, for causing the feed chuck jaw operating power means to hold the feed chuck jaws closed before initiation of retraction of the feed chuck and while the feed chuck is being retracted and until it is retracted to said more retracted disposal position, and means are provided for causing the feed chuck jaw operating power means to open the feed chuck jaws when the feed chuck reaches said more retracted disposal position.

8. The structure according to claim 7 wherein the feed chuck jaws are arranged to open downwardly so that the remnant stock held therein is free to drop downwardly out of the jaws by gravity when they are opened.

9. The structure according to claim 7 wherein the detector is carried on the feed chuck.

10. A cut off machine according to claim 7 wherein the detector detects when the trailing end of the stock is advanced beyond a predetermined advanced position relative to the feed chuck as the feed chuck is retracted, and is operative when the trailing end of the stock is advanced beyond said predetermined position, to render the stop means inoperative to stop retraction of the feed chuck in the retracted starting position and permit it to retract to said more retracted disposal position.

11. A cut off machine according to claim 10 wherein the detector comprises a finger yieldably urged into engagement with the surface of the stock during retraction of the feed chuck, control means are provided and rendered operative by the finger while it is so engaged to cause the stop means to stop the feed chuck in starting retracted position, said finger being released by the stock when the trailing end of the stock has advanced beyond the finger, and the finger being operative, when released, to swing inwardly toward the stock axis and upon such swinging movement, cause operation of the control means to cause the stop means to move to inoperative position and permit the feed chuck to retract to said more retracted disposal position.

12. A cut off machine comprising a frame, a power driven rotary tool head mounted thereon, cutting tool carriages supported by the head for movement toward and away from the rotary axis of the head on cutting strokes and return strokes, respectively, and for concurrent orbital movement by the head about the axis of rotation, a ring carried on the head in coaxial relation to the rotary axis for movement axially relative to the head and for concurrent rotation with the head, first connecting means interconnecting the ring and carriages for moving the carriages on said strokes by the ring, during orbital movement of the tool, consequent upon movement of the ring axially in opposite directions, respectively, power means, second connecting means connecting the power means to the ring for moving the ring axially by the power means, said ring being rotatable about its axis relative to the second connecting means during axial movement, preloaded antifriction means supporting the ring on the head for said axial movement of the ring, and means to preload the second connecting means.

13. A pipe cut off machine comprising a frame, a power driven rotary cutting head thereon for orbiting a cutting tool carriage in an orbital path, a feed chuck having jaws defining a gripping throat, said feed chuck being mounted on the frame for moving along a lineal path, toward and away from the orbital path, to an advanced cutting position and a retracted starting position, while maintaining the throat coaxial with the orbital path, whereby a pipe engaged by the jaws can be advanced by the chuck endwise in coaxial relation to said orbital path, a power operated coupling length stop mounted on the frame and movable into the path of the chuck for stopping the chuck in retracted starting position, and said coupling length stop being located at the opposite end of the feed chuck from the orbital path and being movable into and out of said path, selectively, feed chuck power means to move the feed chuck, jaw power means normally operative to close the feed chuck jaws and hold them closed during advance of the chuck and to release the jaws and hold them released during retraction of the chuck, stop power means for moving the coupling length stop out of the path of the feed chuck thereby to permit the feed chuck to be retracted beyond starting position to a remnant disposal position, means normally operative to cause the jaw power means to release the jaws preparatory to and during retraction of the chuck, and means operative, selectively, to cause the stop power means to move the coupling length stop out of the chuck path and cause the jaw power means to hold the jaws closed until the chuck moves to a more retracted position, and means to cause the jaw power means to release the jaws in the more retracted position.

14. A pipe cut off machine according to claim 13 wherein a power operated facing stop is provided on the frame between the orbital path and the feed chuck, when the feed chuck is in retracted position, said facing stop is movable into and out of the path of feed of pipe by the feed chuck, control means are provided which are operative upon the feed chuck retracting to the disposal position to cause the facing stop to move into the pipe path when a length of pipe is fed through the open retracted feed chuck and so to remain until engaged by the pipe, and means for feeding pipe along said pipe path through the open feed chuck.

No references cited.

WILLIAM W. DYER, Jr., *Primary Examiner.*

HARRISON HINSON, *Examiner.*

UNITED STATES PATENT OFFICE
CERTIFICATE OF CORRECTION

Patent No. 3,276,301                                                      October 4, 1966

James R. Fotheringham et al.

It is hereby certified that error appears in the above numbered patent requiring correction and that the said Letters Patent should read as corrected below.

Column 3, line 41, for "begin" read -- beginning --; line 43, for "out" read -- cut --; line 45, for "remainder" read -- remainders --; column 4, line 55, for "cuttnig" read -- cutting --; column 9, line 26, for "side of the" read -- side the --; column 10, line 49, for "this" read -- the --; line 70, for "by" read -- be --; column 12, line 28, for "18b" read -- 185b --; column 15, line 59, for "313" read -- 213 --; column 16, line 60, for "ahe" read -- the --.

Signed and sealed this 5th day of September 1967.

(SEAL)
Attest:

ERNEST W. SWIDER                                              EDWARD J. BRENNER
Attesting Officer                                                   Commissioner of Patents